(12) United States Patent
Yamamoto

(10) Patent No.: US 8,023,744 B2
(45) Date of Patent: Sep. 20, 2011

(54) PATTERN MATCHING SYSTEM AND TARGETED OBJECT PURSUIT SYSTEM USING LIGHT QUANTITIES IN DESIGNATED AREAS OF IMAGES TO BE COMPARED

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 1187 days.

(21) Appl. No.: 11/686,561

(22) Filed: Mar. 15, 2007

(65) Prior Publication Data
US 2007/0217686 A1 Sep. 20, 2007

(30) Foreign Application Priority Data
Mar. 16, 2006 (JP) ................... 2006-072652

(51) Int. Cl.
*G06K 9/62* (2006.01)
(52) U.S. Cl. ........................ 382/209
(58) Field of Classification Search .................. None
See application file for complete search history.

(56) References Cited

U.S. PATENT DOCUMENTS

| | | | |
|---|---|---|---|
| 6,590,999 B1 * | 7/2003 | Comaniciu et al. | 382/103 |
| 7,561,621 B2 | 7/2009 | Itoh et al. | |
| 2002/0039438 A1 * | 4/2002 | Mori et al. | 382/154 |
| 2002/0168091 A1 * | 11/2002 | Trajkovic | 382/107 |
| 2003/0099407 A1 * | 5/2003 | Matsushima | 382/274 |
| 2003/0103648 A1 * | 6/2003 | Ito et al. | 382/103 |
| 2005/0047656 A1 * | 3/2005 | Luo et al. | 382/167 |
| 2005/0100095 A1 | 5/2005 | Itoh et al. | |
| 2008/0036861 A1 | 2/2008 | Yamamoto | |
| 2009/0185622 A1 | 7/2009 | Itoh et al. | |

FOREIGN PATENT DOCUMENTS

| | | |
|---|---|---|
| JP | 1-169583 | 7/1989 |
| JP | 9-231358 | 9/1997 |
| JP | 2002-372664 | 12/2002 |
| JP | 2004-104656 | 4/2004 |
| JP | 2005-045383 | 2/2005 |
| JP | 2005-338352 | 12/2005 |
| JP | 2007-251636 | 9/2007 |

OTHER PUBLICATIONS

English Language Abstract of JP 2002-372664.
U.S. Appl. No. 11/689,664 to Yamamoto, filed Mar. 22, 2007.
U.S. Appl. No. 11/686,578 to Yamamoto, filed Mar. 15, 2007.
Japan Office action, dated Jan. 11, 2011 along with an english translation thereof.

* cited by examiner

*Primary Examiner* — Daniel Mariam
*Assistant Examiner* — Elisa Rice
(74) *Attorney, Agent, or Firm* — Greenblum & Bernstein, P.L.C.

(57) ABSTRACT

A pattern matching system that outputs an likeness values, comprising a designation block, a comparison block, a calculation block and an output block, is provided. The likeness value shows how much a first and second image compares to each other. The designation block designates a first and second image data as data to be compared. The first and second image data comprises 2^x of area data. The comparison block compares the data level of the area data corresponding to pattern areas at the relatively same location in the first and second images. The calculation block calculates the likeness value. The likeness value varies according to the number of the pattern areas where the absolute value of the difference between the compared data levels of the area data is less than a predetermined standard value.

6 Claims, 20 Drawing Sheets

FIG. 16

|  | 70 | 120 | 30 | 60 | 55 |  |
|---|---|---|---|---|---|---|
|  | 40 | 110 | 100 | 70 | 40 | 105 |
|  | 150 | 85 | 95 | 65 | 25 | 40 |
|  | 100 | 120 | 60 | 30 | 25 | 45 |
|  |  | 120 | 110 | 95 | 80 | 50 |
|  |  | 90 | 75 | 80 | 20 |  |

|   | 1 | 0 | 0 | 0 |   |
|---|---|---|---|---|---|
| 0 | 0 | 0 | 0 | 1 | 0 |
| 0 | 0 | 0 | 0 | 1 | 1 |
| 0 | 1 | 1 | 0 | 1 | 1 |
| 1 | 1 | 1 | 1 | 1 | 1 |
|   | 0 | 0 | 1 | 1 |   |

|   | 0 | 1 | 0 | 0 |   |
|---|---|---|---|---|---|
| 1 | 0 | 0 | 0 | 1 | 0 |
| 0 | 1 | 0 | 1 | 1 | 1 |
| 0 | 1 | 1 | 0 | 0 | 1 |
| 0 | 1 | 1 | 0 | 1 | 0 |
|   | 1 | 1 | 1 | 1 |   |

12b

GA1

PATTERN MATCHING SYSTEM AND TARGETED OBJECT PURSUIT SYSTEM USING LIGHT QUANTITIES IN DESIGNATED AREAS OF IMAGES TO BE COMPARED

BACKGROUND OF THE INVENTION

1. Field of the Invention

The present invention relates to a pattern matching system that determines whether or not a plurality of images matches each other, and a targeted object pursuit system that pursues the movement of a specified targeted object within a plurality of images captured sequentially using the above pattern matching system.

2. Description of the Related Art

A pattern matching system that calculates the likeness between a plurality of images is known. The pattern matching is used for pursuit of a targeted object moving within a plurality of images captured sequentially.

In prior pattern matching, the likeness is calculated by the following operation. First, the captured image is divided into smaller image components and the luminance of the divided image components is detected. Second, the luminance level of each image component into which a first image is divided is compared to that of a corresponding image component, into which a second image of the same location but subsequent to the first image, is divided. Finally, a value based on the number of image components of which the luminance levels from the first and second images are in agreement with each other is calculated as the likeness between the first and second images.

The greater the number of image components that are compared, the greater the accuracy of the calculated likeness value suggesting whether or not the first and second images are in agreement with each other. However, the greater the number of compared image components also increases the size requirement, in bits, of the digital arithmetical unit necessary for the pattern matching system. On the other hand, even though a higher bit digital arithmetical unit is mounted, the capacity of the digital arithmetical unit is not always used completely.

SUMMARY OF THE INVENTION

Therefore, an object of the present invention is to provide a pattern matching system that uses a digital arithmetical unit effectively, and a targeted object pursuit system that makes use of the pattern matching system.

According to the present invention, a pattern matching system that outputs a likeness value, comprising a designation block, a comparison block, a calculation block, and an output block, is provided. The likeness value shows how much a first and second image compares to each other. The designation block designates first and second image data corresponding to said first and second images, respectively, as data to be compared. The first and second image data is digital data. The first and second image data comprises $2^x$ (x is a natural number) of area data. Data level of the area data varies according to the intensity of light incident to a pattern area. The first and second images comprises $2^x$ of the pattern areas. The comparison block compares data levels of the area data corresponding to the pattern areas at the relatively same location in the first and second images. The calculation block calculates the likeness value. The likeness value varies according to the number of the pattern areas where the absolute value of the difference between the compared data levels of the area data of the first and second images is less than a predetermined standard value. The output block outputs the likeness value.

Further, said pattern area is broadened when the intensity of light of the entire first or second image is lower than a first threshold value.

According to the present invention, a targeted object pursuit system that pursues the movement of a targeted object within a plurality of sequentially captured images is provided. The targeted object pursuit system comprises a first setting block, a second setting block, a recognition block, a data generator, a comparison block, a calculation block, a determination block, and a re-designation block. The first setting block initially designates a partial area located at a predetermined location in the captured image as a pursuit area for pursuing the targeted object. The second setting block designates areas displaced from the pursuit area in a first and second direction as a first and second candidate area, respectively. The recognition block extracts a standard image from the captured image captured at a first timing. The recognition block extracts a first and second candidate image from the captured image at a second timing which is subsequent to the first timing. The standard image corresponds to the pursuit area. The first and second candidate images correspond to the first and second candidate area, respectively. The data generator generates area data of which the data level varies according to the intensity of light incident to a pattern area. The standard image, and the first and second images comprises $2^x$ (x is a natural number) of the pattern areas. The comparison block compares the data level of the area data corresponding to the pattern areas at the relatively same location in the standard image and one of either the first or second images. The calculation block calculates the likeness value. The likeness value varies according to the number of the pattern areas where the absolute value of the difference between the compared data levels of the area data is less than a predetermined standard value. The determination block determines which direction the targeted object moves during a period between the first and second timing to be either the first or second direction based on the difference between the likeness value of the standard image and the first candidate image and the likeness value of the standard image and the second candidate image. The re-designation block re-designates a candidate area corresponding to the determined direction where the targeted object moved as the new pursuit area.

BRIEF DESCRIPTION OF THE DRAWINGS

The objects and advantages of the present invention will be better understood from the following description, with reference to the accompanying drawings in which:

FIG. 16 shows an example of the luminance value of the small pixel blocks included in the SA;

FIG. 17 shows binary luminance values of the small pixel blocks described in FIG. 16;

FIG. 18 shows an example of the binary luminance values of the small pixel blocks included in the CA1;

DESCRIPTION OF THE PREFERRED EMBODIMENTS

Figure 1:
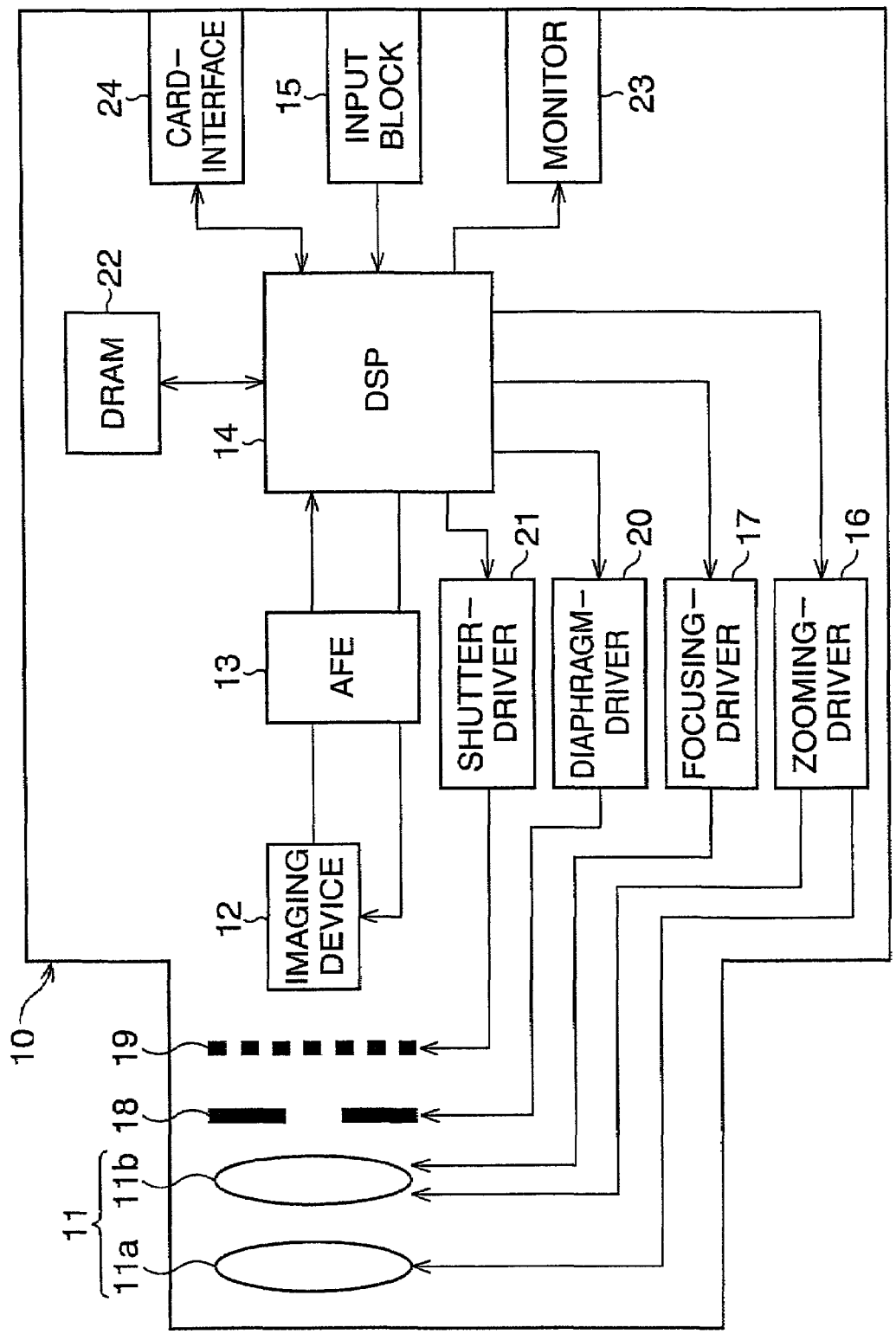
FIG. 1 is a block diagram showing the internal structure of a digital camera having a targeted object pursuit system using a pattern matching system of an embodiment of the present invention.

The present invention is described below with reference to the embodiment shown in the drawings.

In FIG. 1, a digital camera 10 comprises a photographic optical system 11, an imaging device 12, an analog front end (AFE) 13, a DSP 14, an input block 15, a zooming-driver 16, a focusing-driver 17, and other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a zoom lens 11a and a focus lens 11b. The zoom lens 11a and the focus lens 11b are movable along an optical axis of the photographic optical system 11.

The zoom lens 11a and the focus lens 11b form a zoom optical system. The focal length of the photographic optical system 11 is adjusted by moving the zoom lens 11a and the focus lens 11b in relationship to each other. Further, an optical image of an object can be focused on the light-receiving surface of the imaging device 12 by moving the focus lens 11b.

The zoom lens 11a and the focus lens 11b can be manually moved along the optical axis by a user. In addition, the zoom lens 11a and the focus lens 11b can also be moved by the zooming-driver 16. Further, the focus lens 11b can also be moved by the focusing-driver 17 so that the object is brought into focus. Incidentally, the focus adjustment for the movements of the focus lens 11b by the focusing-driver 17 is automatically carried out when an auto focus function, as described later, is commenced.

A diaphragm 18 and a shutter 19 are mounted between the photographic optical system 11 and the imaging device 12. The intensity of light made incident on the light-receiving surface of the imaging device 12 can be varied by adjusting the aperture ratio of the diaphragm 18. An optical image reaches the light-receiving surface by opening the shutter 19, and an optical image is shielded from the light-receiving surface by closing the shutter 19. A diaphragm-driver 20 drives the diaphragm 18 so that the aperture ratio can be adjusted. A shutter-driver 21 drives the shutter 19 so that the shutter can be opened and closed.

Incidentally, the zooming-driver 16, the focusing-driver 17, the diaphragm-driver 20, and the shutter-driver 21 are all connected to the DSP 14. The DSP 14 controls the operations of the zooming-driver 16, the focusing-driver 17, the diaphragm-driver 20, and the shutter-driver 21.

The imaging device 12 is electrically connected to the DSP 14 via the AFE 13. A clock signal is sent from the DSP 14 to the AFE 13, which generates a frame signal and an imaging device driving signal based on the received clock signal. The imaging device driving signal is sent to the imaging device 12. The imaging device 12 is driven based on the imaging device driving signal to generate an image signal that is synchronized with the frame signal.

Incidentally, pixels are arranged in a matrix on the light-receiving surface of the imaging device 12. For example, a pixel is each unit of area into which an effective receiving area, hereinafter referred to as an ERA, of the light-receiving surface is equally divided into n1 rows and n2 columns. Each pixel generates a pixel signal according to the intensity of light incident to the pixel. An image signal comprises a plurality of pixel signals generated by a plurality of pixels in the ERA.

The generated image signal is sent to the AFE 13, which carries out correlated double sampling and gain adjustment on the image signal. In addition, the image signal is converted to image data, which is digital data that is sent to the DSP 14.

The DSP 14 is connected to a dynamic random access memory (DRAM) 22, which is used as a work memory for signal processing carried out by the DSP 14. The image data received by the DSP 14 is temporarily stored in the DRAM 22. The DSP 14 carries out predetermined signal processing on the image data stored in the DRAM 22.

The DSP 14 is connected to a monitor 23. The image data, having undergone predetermined signal processing, is sent to the monitor 23, which is able to display an image corresponding to the received image data.

The DSP 14 is connected to a card-interface 24 which can be connected to a memory card (not depicted). When a release operation, as described later, is carried out, the image data, having undergone predetermined signal processing, is stored in the memory card.

The DSP 14 is connected to the input block 15, where a user inputs operational commands. The input block 15 comprises a release button (not depicted), a multi-functional cross-key (not depicted), a power button (not depicted), and other buttons. The DSP 14 orders each component of the digital camera 10 to carry out a necessary operation according to a user's command input to the input block 15.

For example, by depressing the release button halfway, a first switch (not depicted) is switched on, and exposure adjustment and focus adjustment are then carried out.

In the exposure adjustment, first the intensity of light incident to the ERA is determined based on the image data. Second, adjustment of the aperture ratio of the diaphragm 18, adjustment of shutter speed, and the gain adjustment of the image data by the DSP 14 are carried out based on the determined intensity of light.

Incidentally, the intensity of light incident to either the entire ERA or a partial area of the ERA can be determined. In addition, a weighted exposure adjustment can be carried out by weighting the intensity of light incident to a partial area of the ERA and carrying out the exposure adjustment based on the average intensity of light incident to the adjacent areas surrounding the partial area.

In the focus adjustment, the position of the focus lens 11b is adjusted so that an optical image of the desired object can be focused on the light-receiving surface.

Further, by fully depressing the release button a second switch (not depicted) is switched on. Then, the shutter 19 is driven so as to open and close, and the imaging device 12 is driven so as to capture a static optical image.

Figure 2:
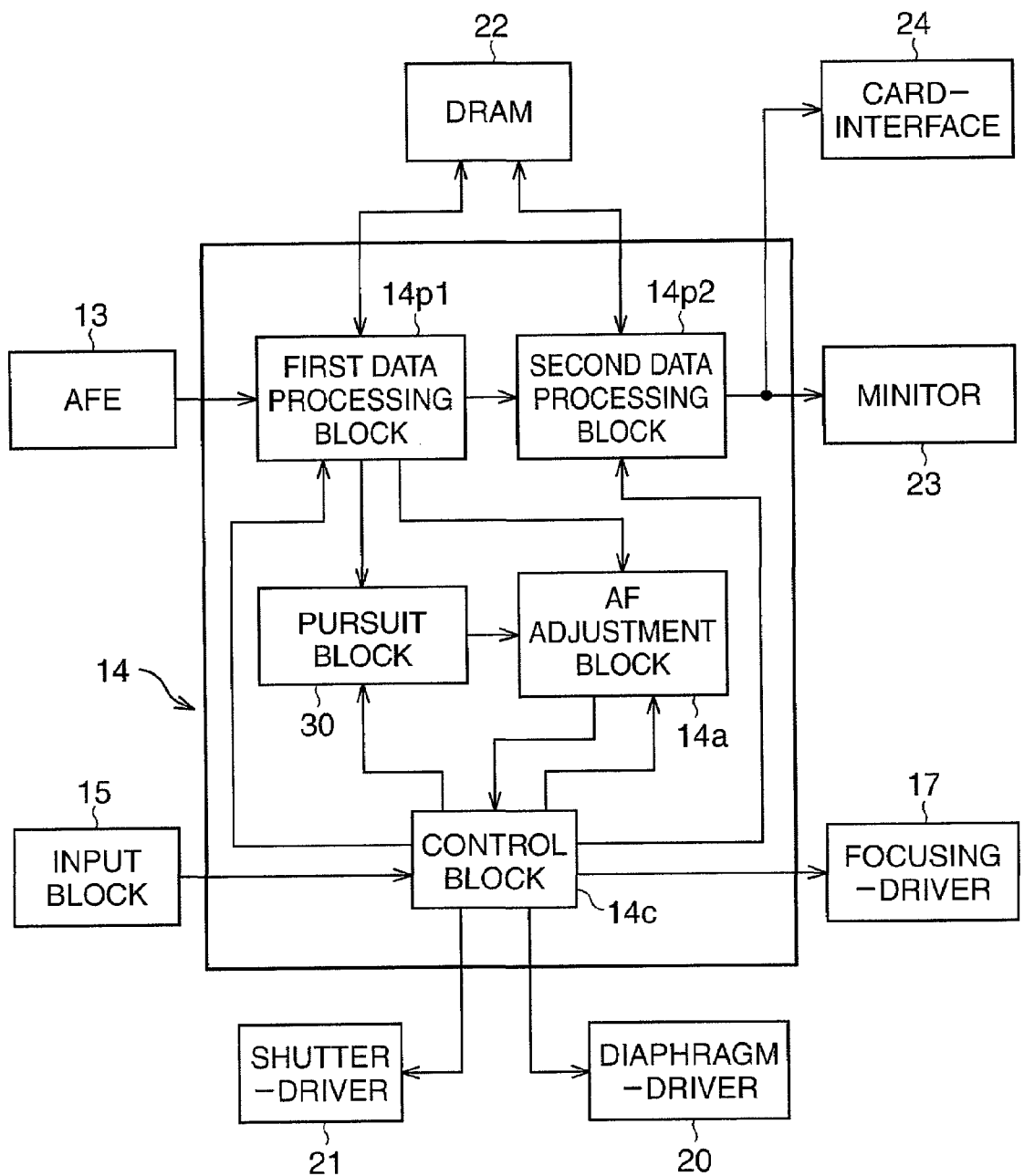
FIG. 2 is a block diagram showing the internal structure of the DSP.

Next, the internal structure of the DSP 14 is explained below, using FIG. 2. The DSP 14 comprises a first data processing block 14p1, a second data processing block 14p2, a pursuit block 30, an AF adjustment block 14a, and a control block 14c.

The image data sent from the AFE 13 is input to the first data process block 14p1, which stores the received image data in the DRAM 22. In addition, the first data process block 14p carries out predetermined data processing, such as color interpolation processing, white balance processing, and luminance data generation processing on the stored image data. The first data process block 14p1 then sends the image data, after having undergone predetermined data processing, to the second data processing block 14p2.

The second data processing block 14p2 carries out predetermined data processing, such as cramp processing and blanking processing, on the received image data. Afterwards, the second data process block 14p2 sends the image data to the monitor 23 or the memory card via the card-interface 24.

The first data processing block 14p1 also sends the image data to the pursuit block 30 and the AF adjustment block 14a. Based on the received image data, the pursuit block 30 and the AF adjustment block 14a determine, in cooperation with each other the position of the focus lens 11b so that a desired object is brought into focus on the light-receiving surface of the imaging device 12.

The pursuit block 30 designates one partial area of the entire captured image as a scanning area, hereinafter referred to as SA. The SA is used for capturing an optical image of an object that is desired to be in focus on the light-receiving surface. If the targeted object, which is an object desired to be in focus, moves within the captured image, the pursuit block 30 pursues the targeted object by sequentially re-designating a new partial area where the targeted object has moved, effectively updating the SA.

The AF adjustment block 14a determines the position of the focus lens 11b so that an optical image captured by the SA is in focus. Incidentally, the position of the focus lens 11b is determined according to the contrast detection method.

The digital camera 10 has both normal auto focus and pursuit auto focus functions. By carrying out the normal auto focus function, an object that is located in a fixed partial area of the entire captured image is brought into focus. By carrying out the pursuit auto focus function, an object that moves within the entire captured image is brought into focus. Either the normal auto focus function or the pursuit auto focus function is selected by an operational command to the input block 15.

An input signal according to an operational command input to the input block 15 is sent from the input block 15 to the control block 14c, which controls the first data processing block 14p1, the second data processing block 14p2, the pursuit block 30, the AF-adjustment block 14a, and each component of the digital camera 10 according to the received input signal.

For example, in the exposure adjustment the control block 14c controls both the diaphragm driver 20 to drive the diaphragm 18 and the shutter driver 21 to open and close the shutter 19.

Further, the control block 14c controls the focusing-driver 17 to re-position the focus lens 11b in the focus adjustment. In the focus adjustment, the control block 14c receives lens position data corresponding to the position of the focus lens determined by the AF-adjustment block 14a. The control block 14c controls the focusing-driver 17 based on the received lens position data.

Figure 3:
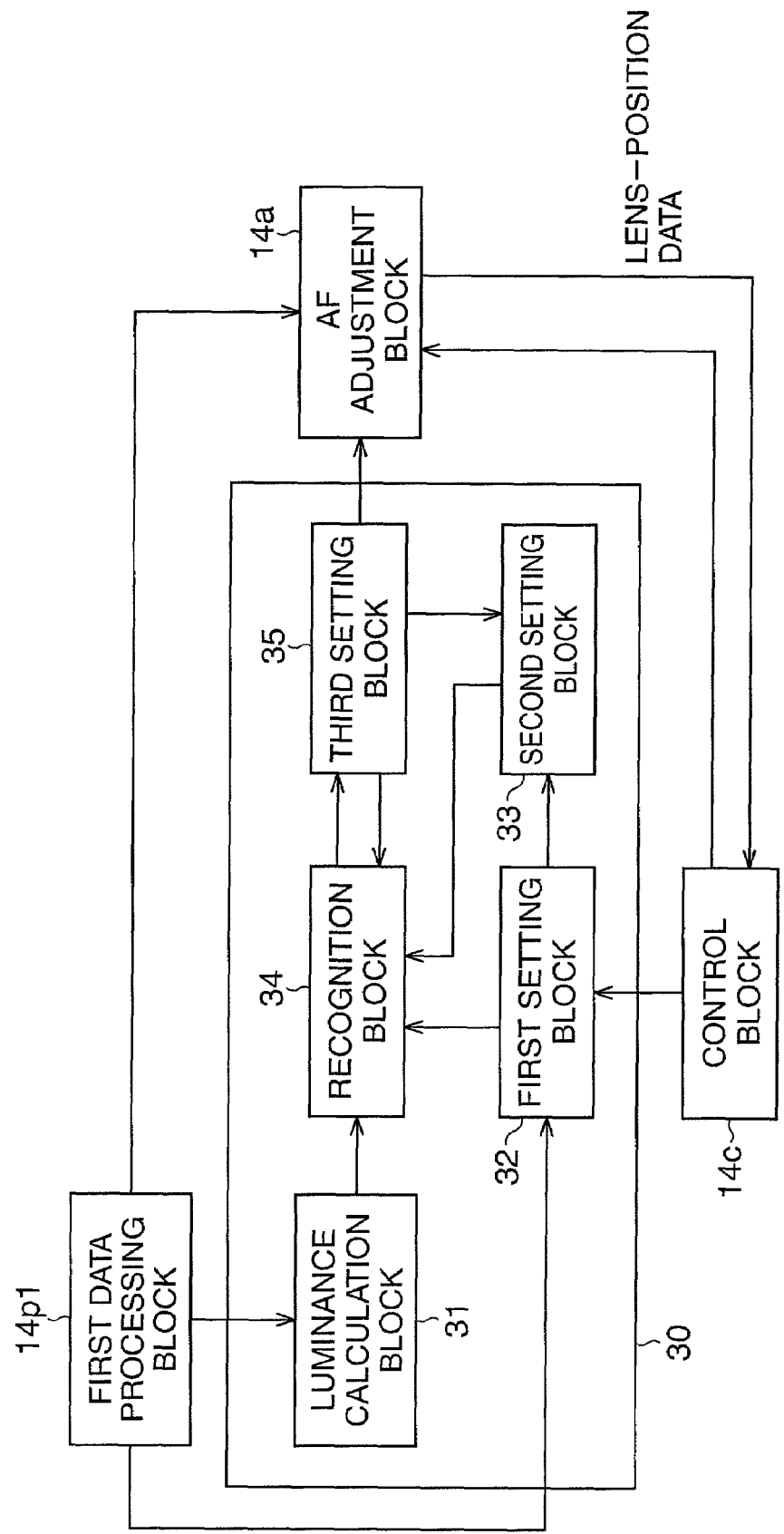
FIG. 3 is a block diagram showing the internal structure of the pursuit block.

Next, the structure and operation of the pursuit block 30 are explained in detail below using FIGS. 3~5. The pursuit block 30 comprises a luminance calculation block 31, a first setting block 32, a second setting block 33, a recognition block 34, and a third setting block 35. Incidentally, each component is controlled by the control block 14c.

Luminance data for pixels within the ERA is sent from the first data processing block 14p1 to the luminance calculation block 31 when the pursuit auto focus function is carried out. The luminance calculation block 31 calculates the luminance of either a small pixel block or a large pixel block based on the received luminance data, for the purpose of minimizing the time of pursuit.

Figure 4:
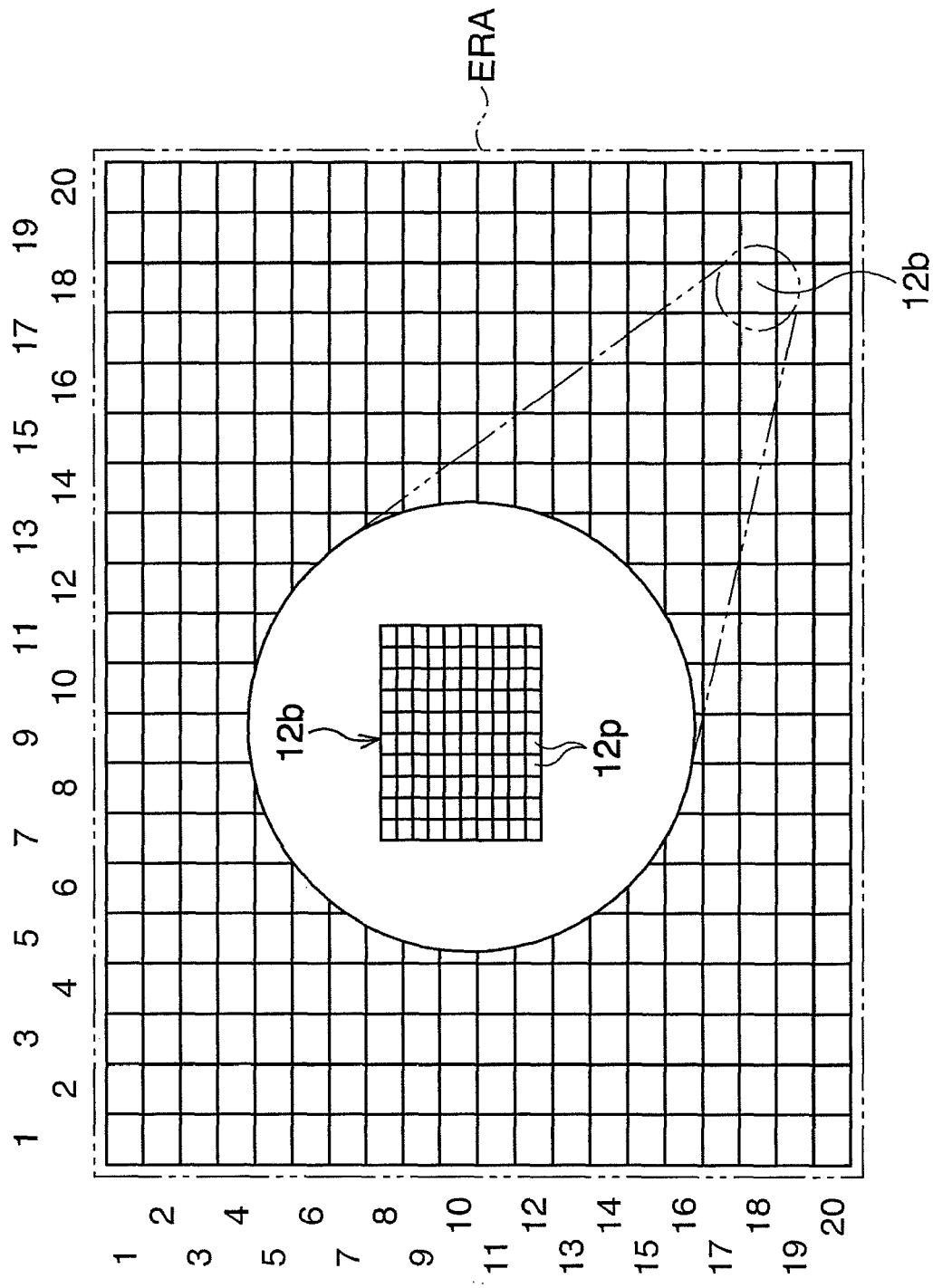
FIG. 4 shows the structure of the small pixel block.

As shown in FIG. 4, the small pixel block 12b is unit of area representing 1/400 of the ERA, which has been equally partitioned into twenty rows and twenty columns. The small pixel block 12b is equally partitioned itself, so that the small pixel block 12b comprises one hundred pixels arranged in a matrix of ten rows by ten columns. The luminance of the small pixel block 12b is calculated by averaging the luminance of the 100 pixels included in the small pixel block 12b. Data corresponding to the calculated luminance of the small pixel block 12b is sent to the recognition block 34.

Figure 5:
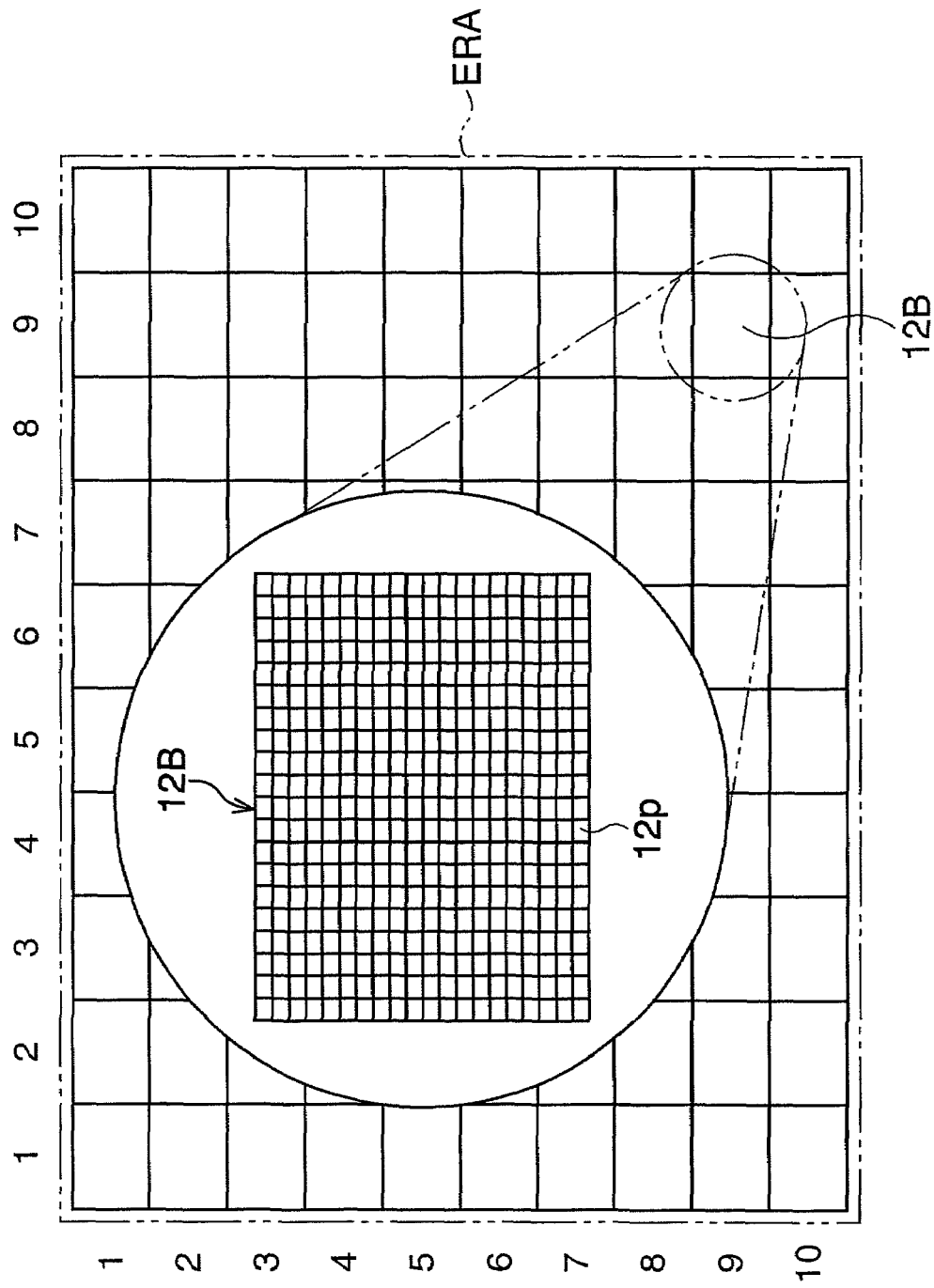
FIG. 5 shows the structure of the large pixel block.

As shown in FIG. 5, the large pixel block 12B is a unit of area representing one hundredth of the ERA, which has been equally partitioned into ten rows and ten columns. The large pixel block 12B comprises four hundred pixels arranged in a matrix of twenty rows by twenty columns. The luminance of the large pixel block 12B is calculated by averaging the luminance of the 400 pixels included in the large pixel block 12B. Data corresponding to the calculated luminance of the large pixel block 12B is sent to the recognition block 34.

Incidentally, the light intensity incident to the small pixel block 12b or the large pixel block 12B is the same that is used for the intensity detected in the partial area of the ERA for the exposure adjustment. For example, the intensity of light incident to the small pixel block 12b or the large pixel block 12B is detected for a spot photometry measurement or a spot emphasized photometry measurement.

On carrying out the focusing adjustment, the first setting block 32 determines the location of the initial SA so that the center of both the ERA of the imaging device 12 and the initial SA agree with each other. In addition, the first setting block 32 determines the size of the SA based on the luminance of the entire ERA. The initial SA is designated once the location and size of the initial SA has been determined.

Figure 6:
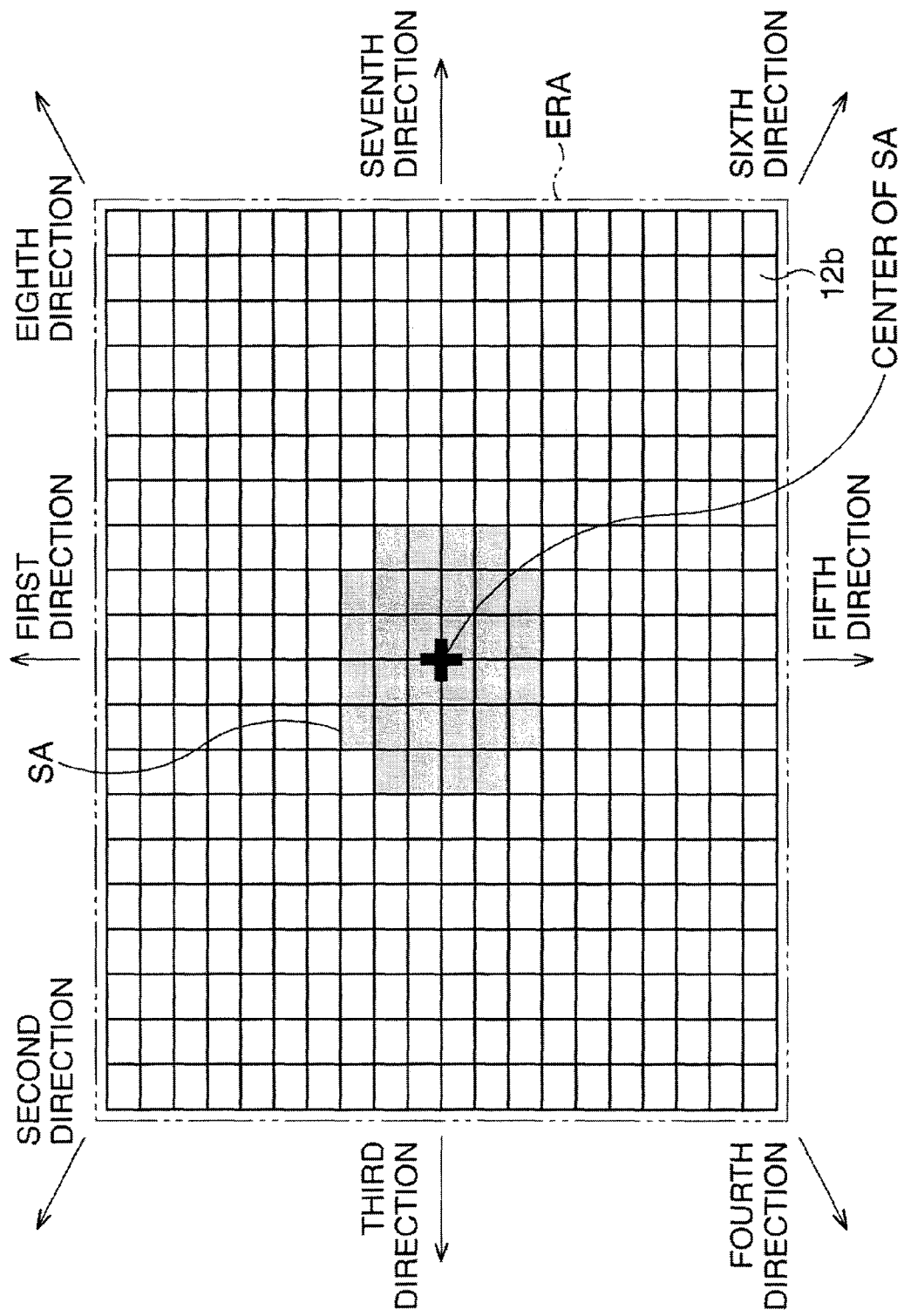
FIG. 6 shows the light-receiving surface, comprising small pixel blocks, for explaining the form of the scanning area.

The first setting block 32 receives the data corresponding to the luminance of the entire ERA from the first data processing block 14p1. When the luminance of the entire ERA is greater than the first threshold value, the size of the SA is determined to be the total size of thirty two small pixel blocks 12b, with 32 being the fifth power of two. In addition, the shape of the SA is determined to be a form created by removing the four corner blocks from a rectangle comprising small pixel blocks 12b of six columns across by six rows down, as shown in FIG. 6.

Figure 7:
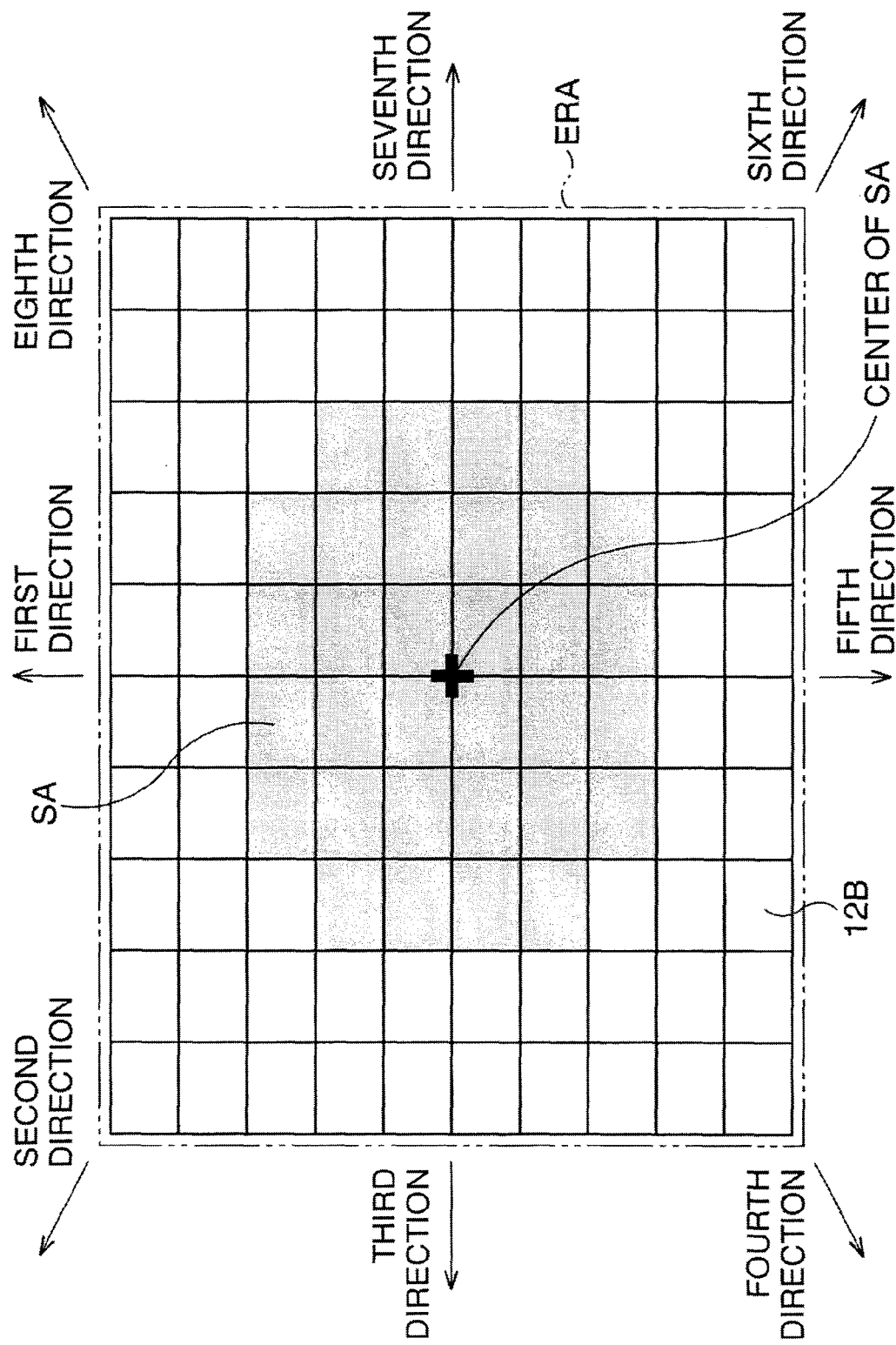
FIG. 7 shows the light-receiving surface, comprising large pixel blocks, for explaining the form of the scanning area.

On the other hand, when the luminance of the entire ERA is less than the first threshold value, the size of the SA is determined to the total size of thirty two large pixel blocks 12B, with 32 being the fifth power of two. In addition, the shape of the SA is determined to be a form created by removing the four corner blocks from a rectangle comprising large pixel blocks 12B of six columns across by rows down, as shown in FIG. 7.

Incidentally, the large pixel block 12B on the ERA are separated from each other by borderlines formed by a plurality of vertical and horizontal lines demarcating the columns and rows created from partitioning the ERA. In a similar manner, borderlines formed by a plurality of vertical and horizontal lines also separate the small pixel blocks 12b from each other. One of the many intersection points formed by the crosshairs of intersecting vertical and horizontal borderlines can be decided upon as the center of the SA, and the location of the initial SA id designated from the location of the center of the SA. The location of the SA is designated based on the operational command which is input to the input block 15.

Data corresponding to the initially designated SA is sent to the second setting block 33. The second setting block 33 designates eight candidate areas which are of the same size as the current SA, but whose locations are different and determined by displacing the current SA by the same magnitude, but in eight directions.

The first~eighth directions are predetermined as the eight directions in which to displace the SA to designate the candidate areas. The upper, upper left, left, lower left, lower, lower right, right, and upper right directions are predetermined as the first, second, third, fourth, fifth, sixth, seventh, and eighth directions, respectively, as shown in FIGS. 6, 7.

The magnitude of the displacement from the SA in the first~eighth directions is determined according to the focal length. The longer the focal length is, the greater the magnitude of displacement is predetermined to be. For example, when the focal length adjustment is minimal, the magnitude of displacement is determined to be the length corresponding to either one small block 12b or one large block 12B.

Each location of eight candidate areas in the case where the SA is comprised of thirty two small pixel blocks 12b is explained below. Incidentally, each location of eight candidate areas in the case where the SA is comprised of thirty two large pixel blocks 12B are determined similar to the method for small pixel blocks 12b described below.

Figure 8:
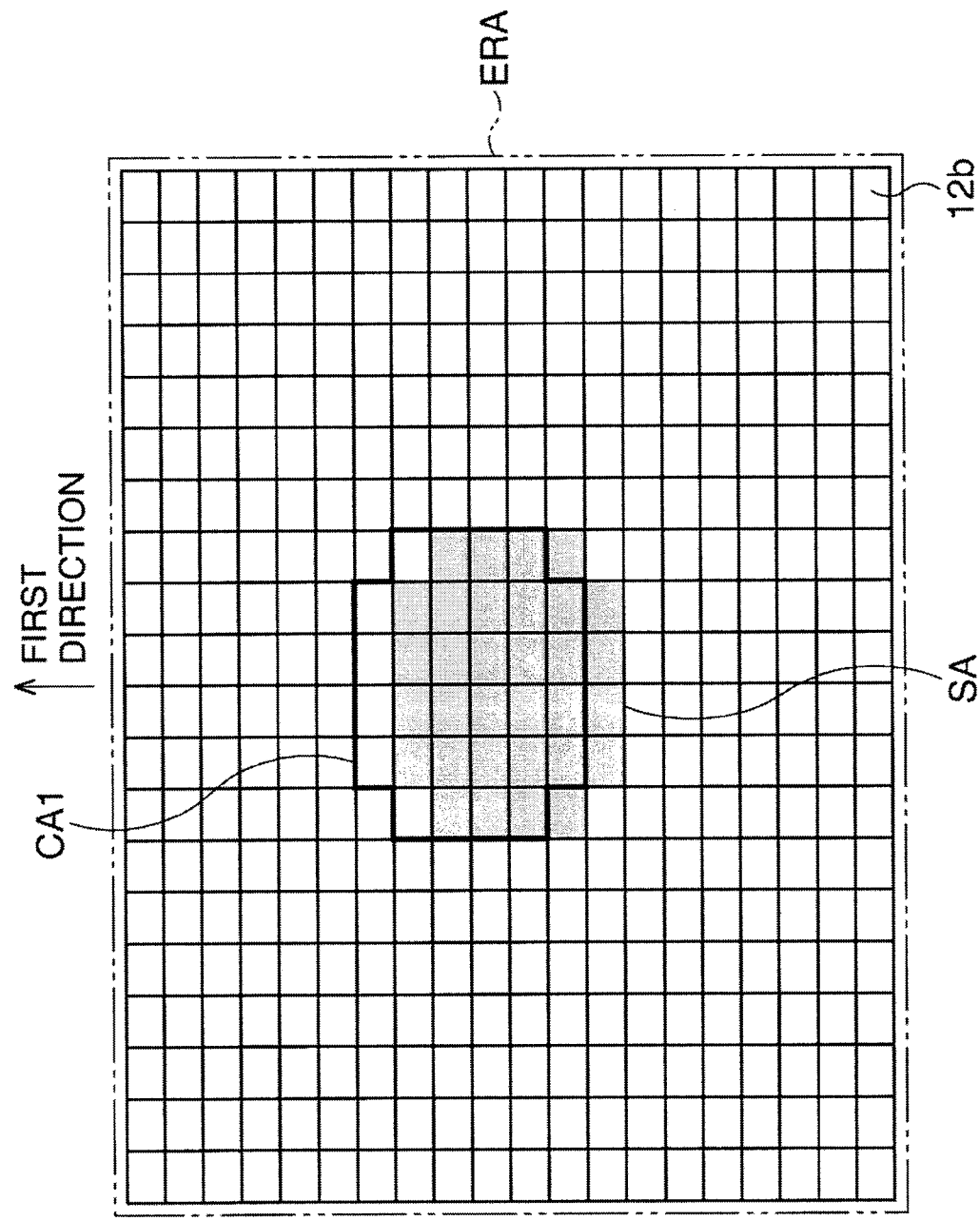
FIG. 8 shows a location of the CA1 relative to the SA.
Figure 9:
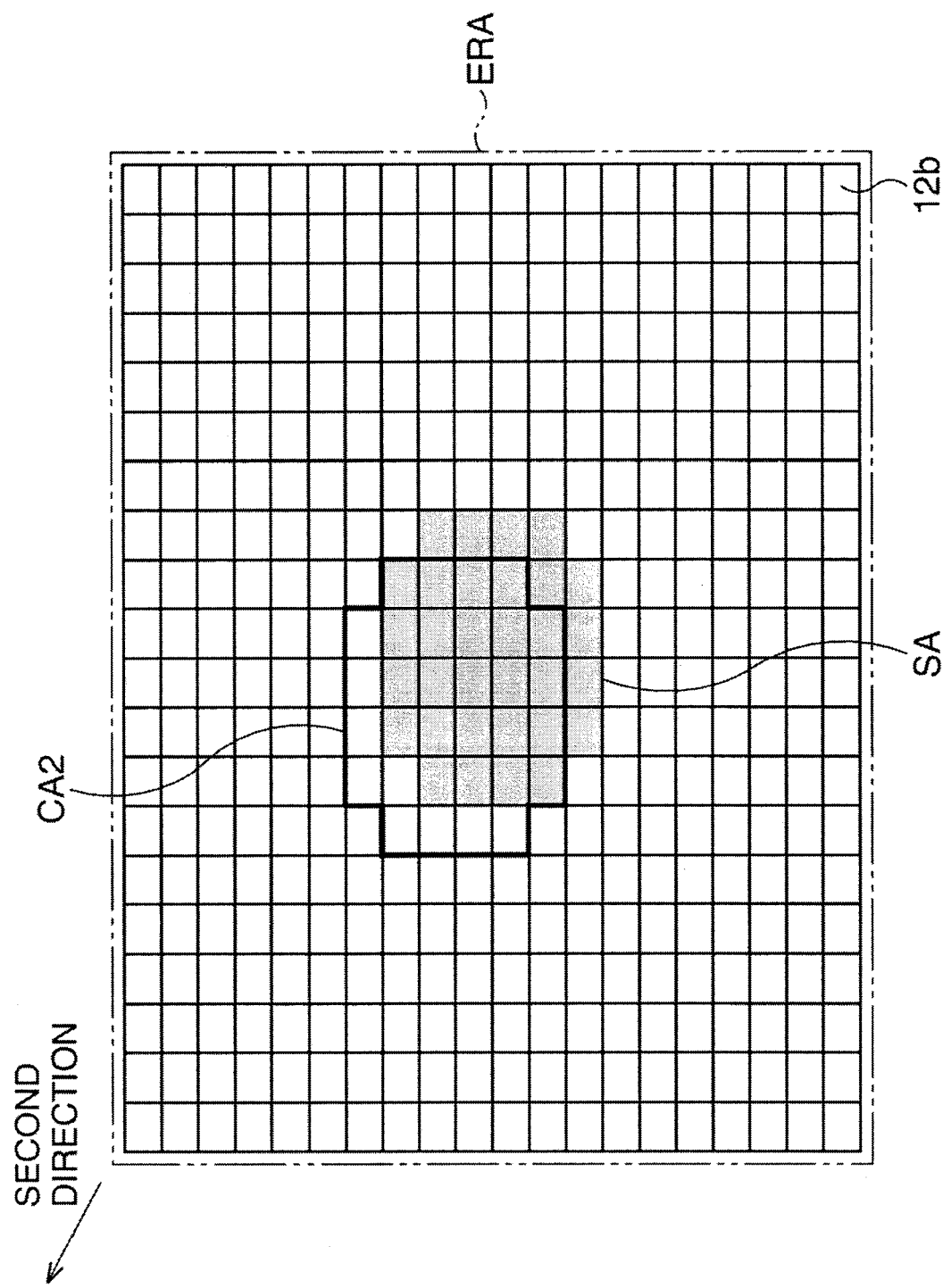
FIG. 9 shows a location of the CA2 relative to the SA.
Figure 10:
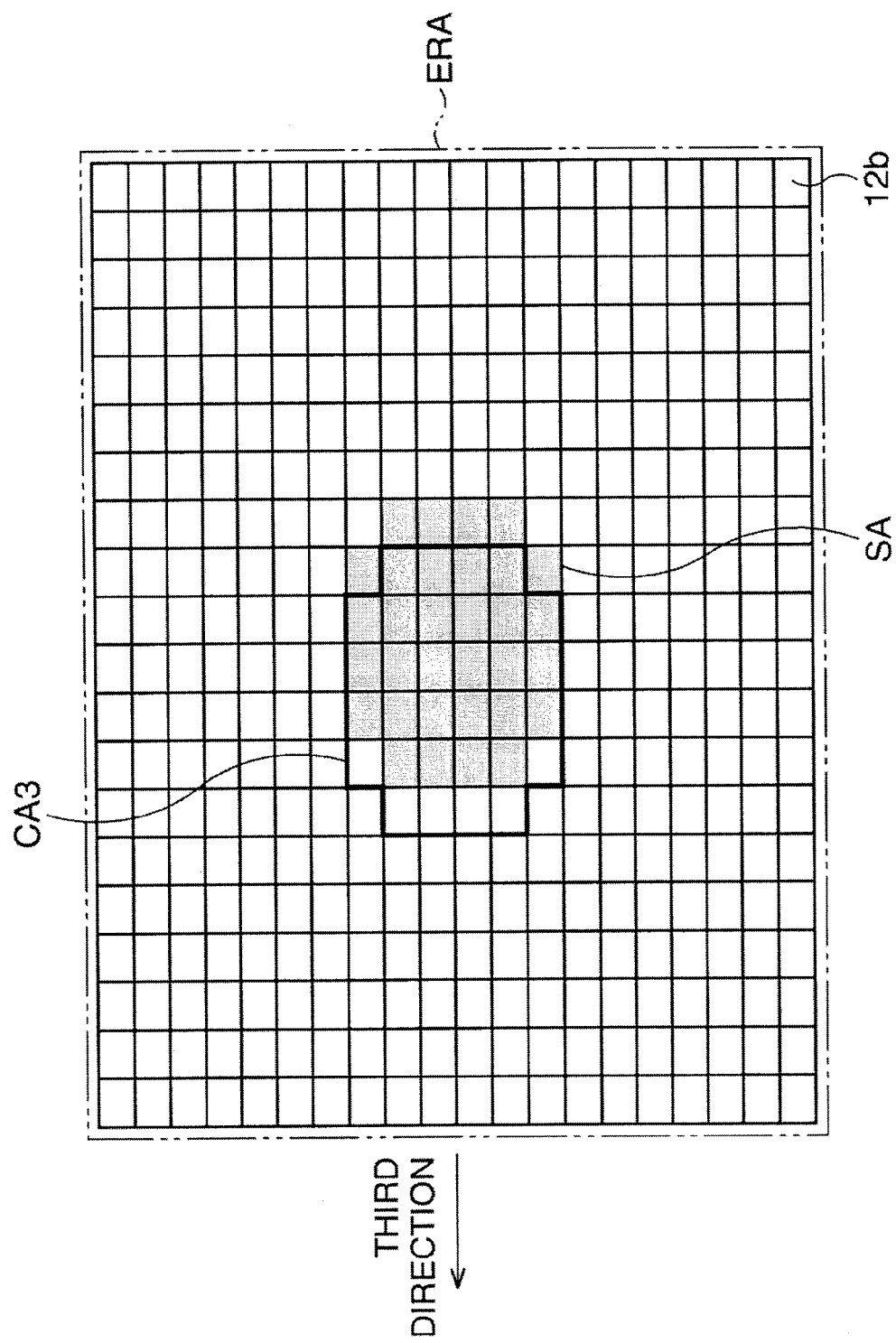
FIG. 10 shows a location of the CA3 relative to the SA.
Figure 11:
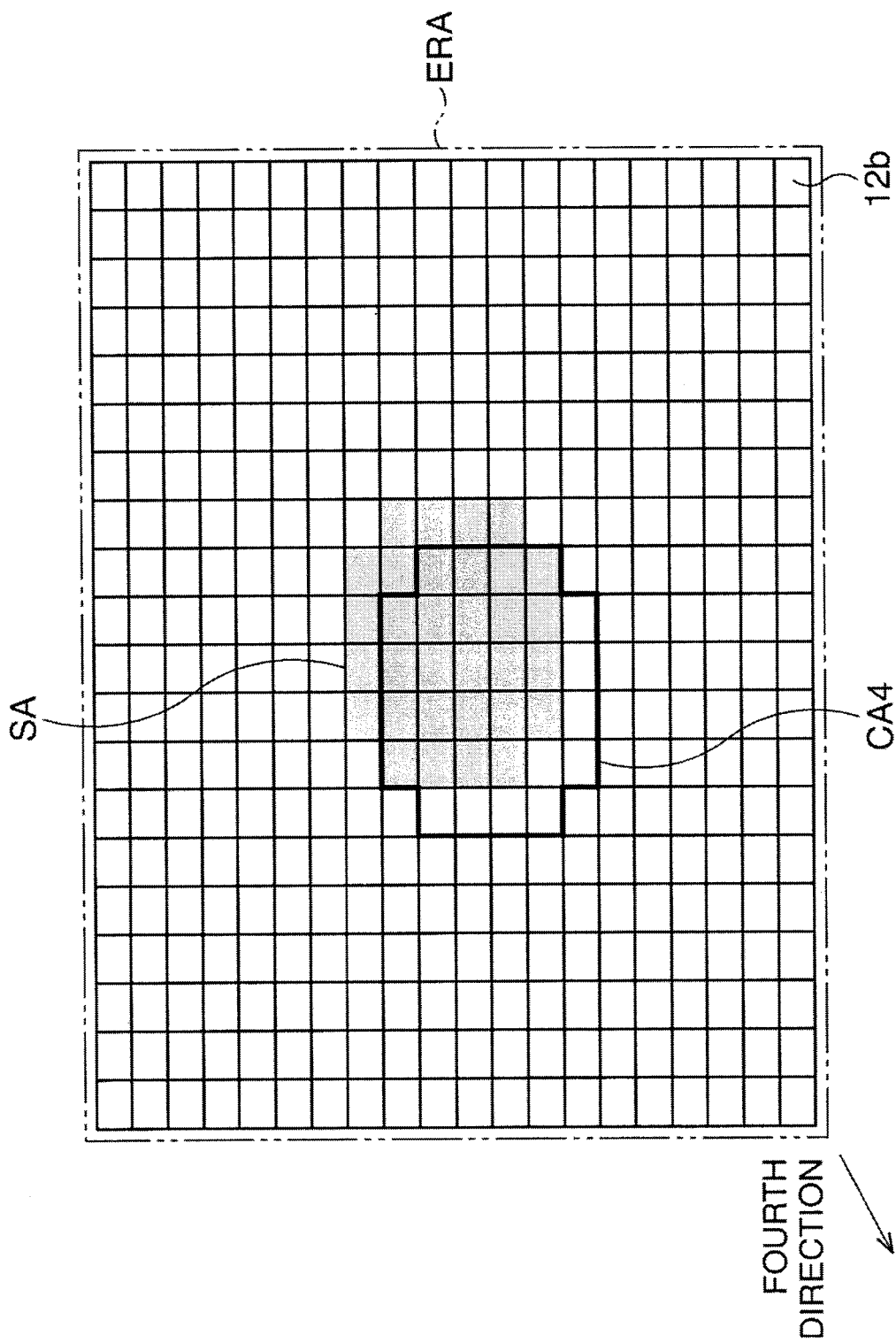
FIG. 11 shows a location of the CA4 relative to the SA.
Figure 12:
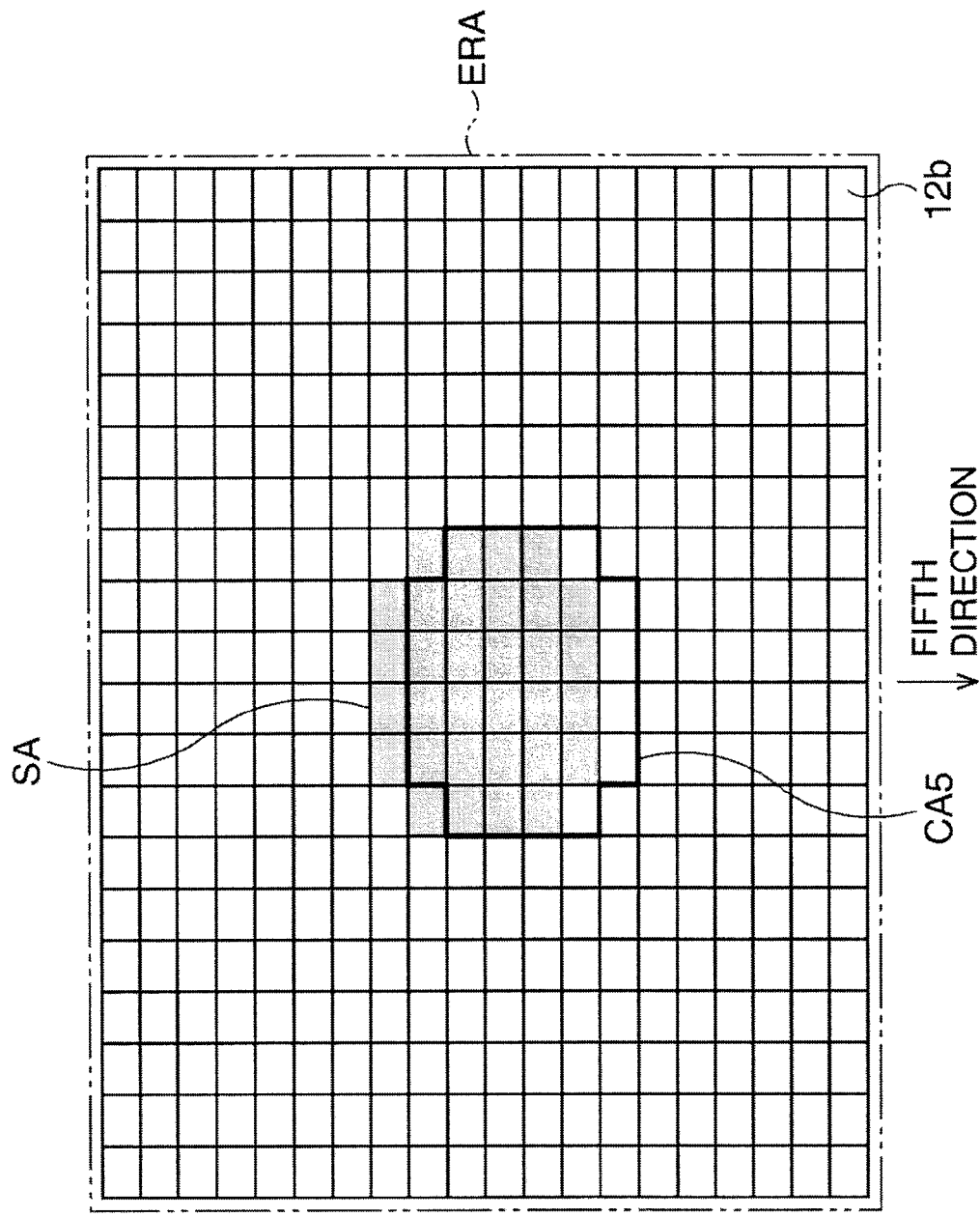
FIG. 12 shows a location of the CA5 relative to the SA.
Figure 13:
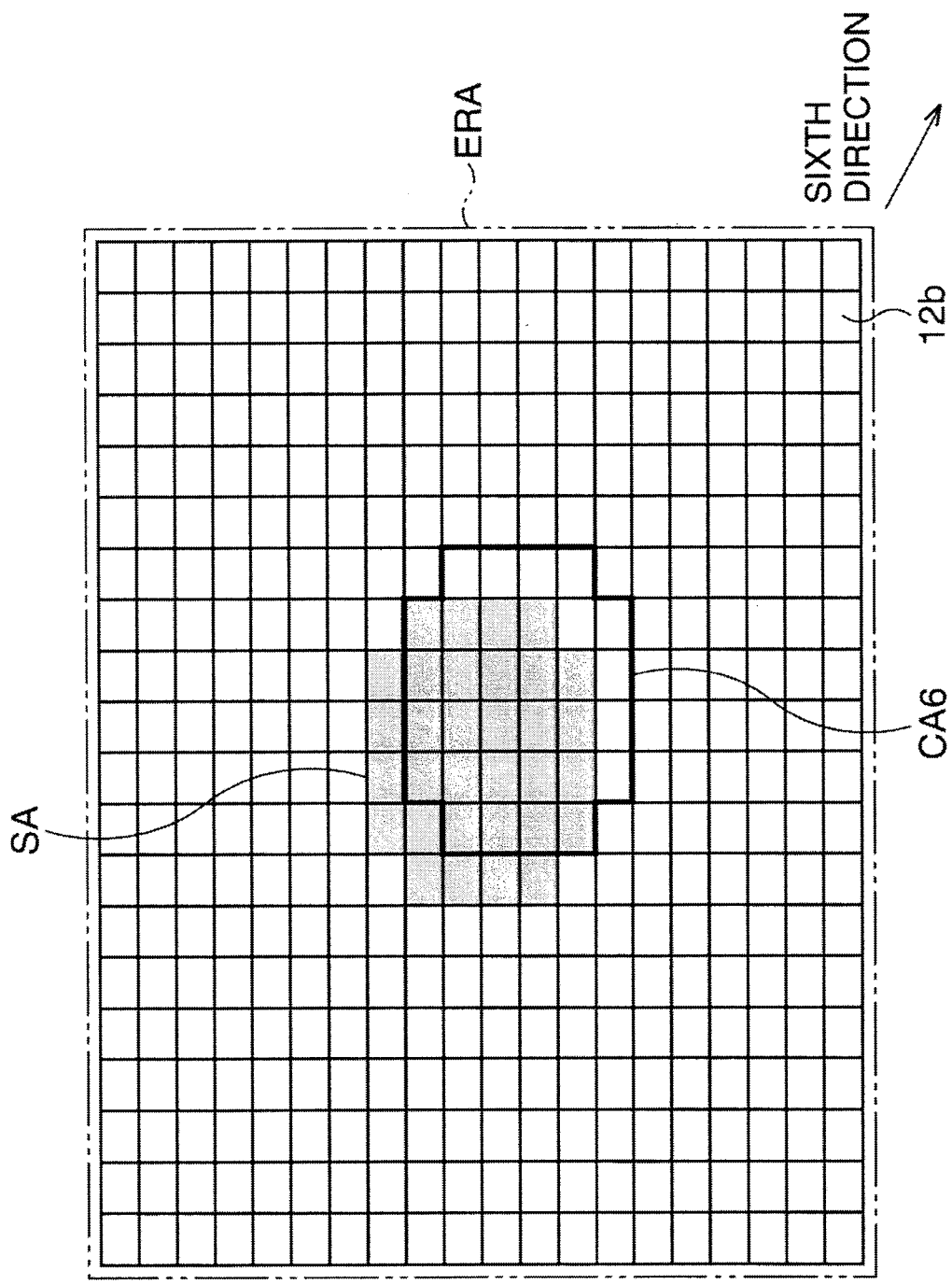
FIG. 13 shows a location of the CA6 relative to the SA.
Figure 14:
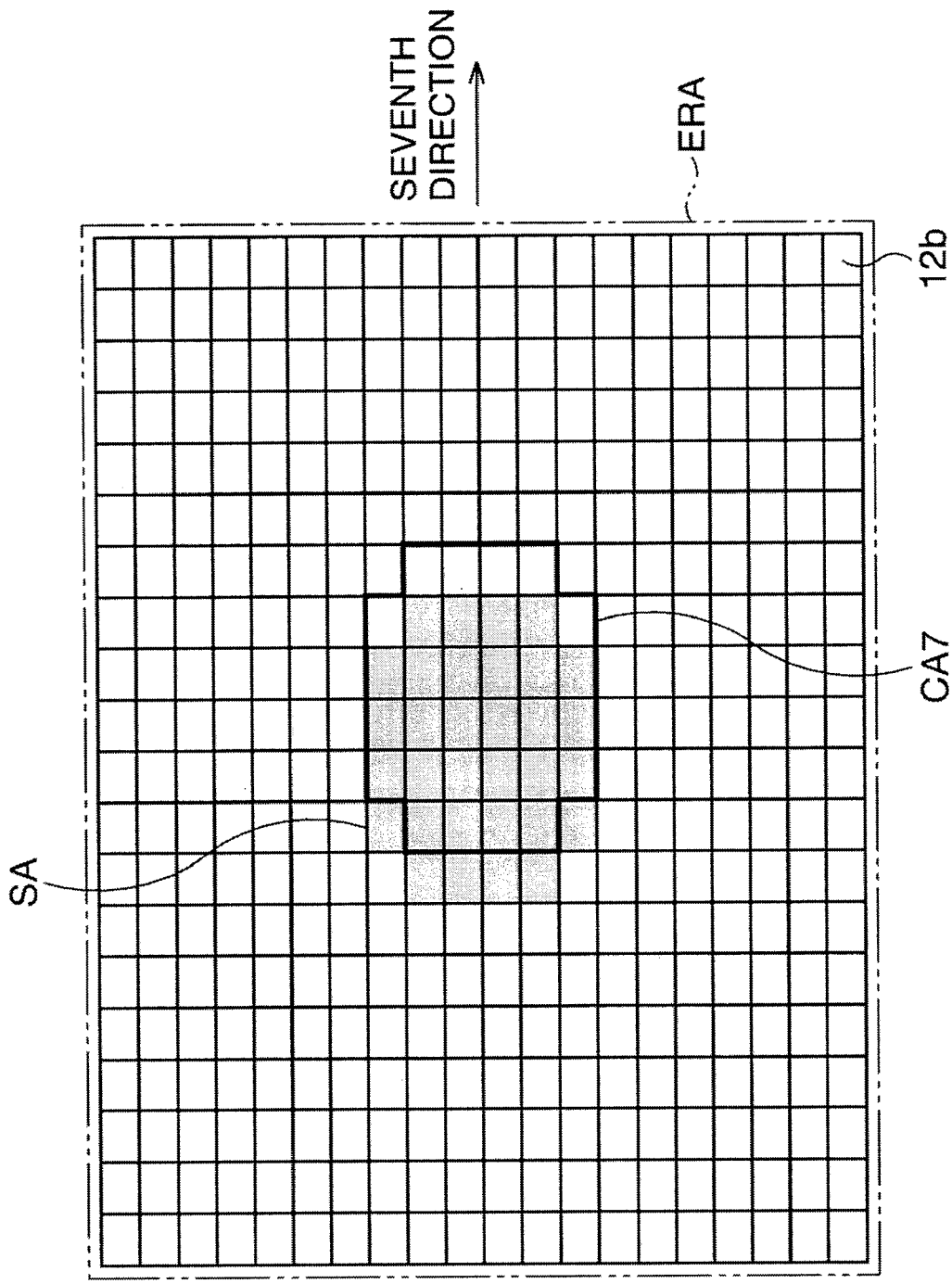
FIG. 14 shows a location of the CA7 relative to the SA.
Figure 15:
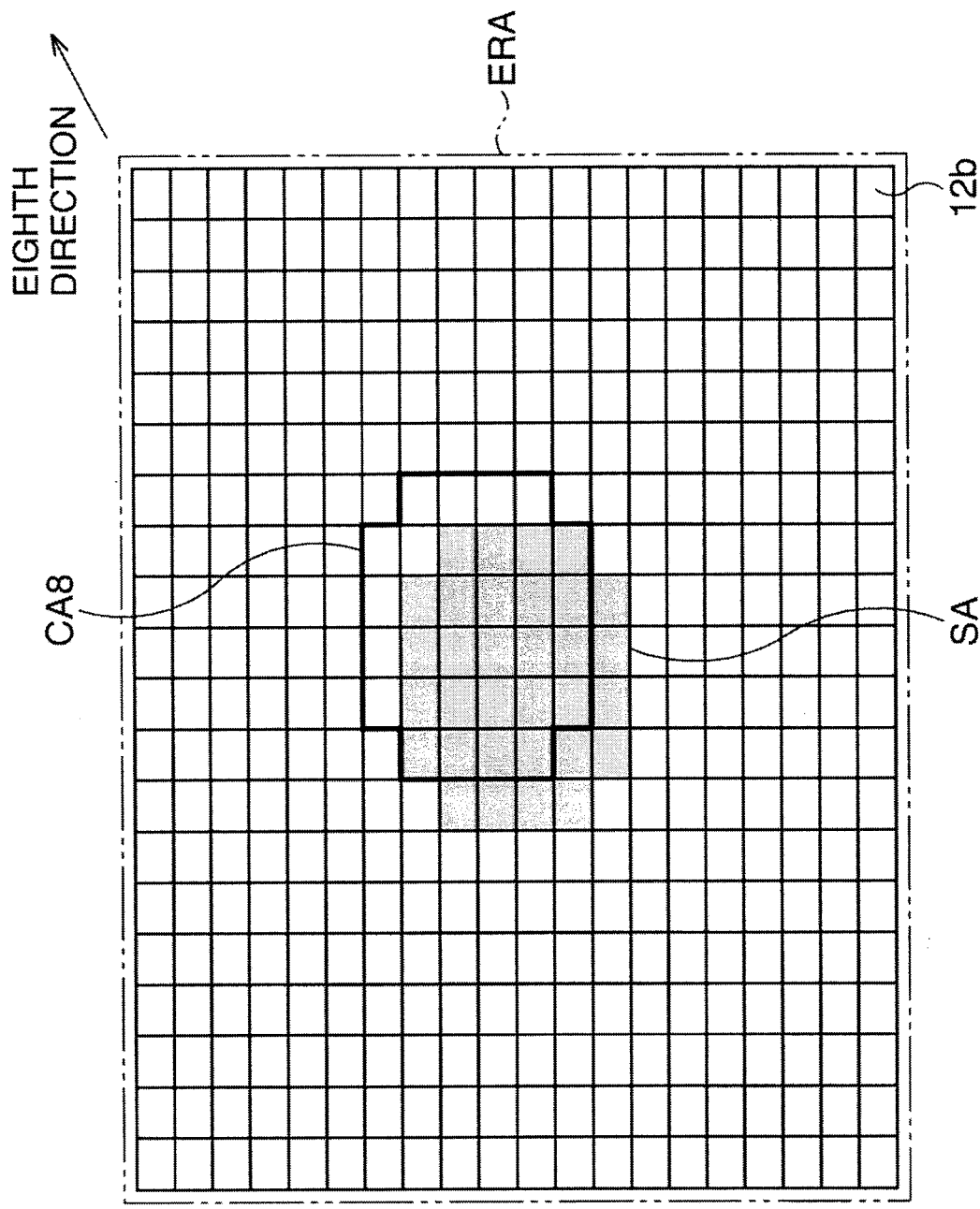
FIG. 15 shows a location of the CA8 relative to the SA.

A candidate area displaced through one small pixel block 12b from the SA in the first direction is designated to be the first candidate area, hereinafter referred to as CA1, shown in FIG. 8. A candidate area displaced through one small pixel block 12b from the SA in the second direction is designated to be the second candidate area, hereinafter referred to as CA2, shown in FIG. 9. A candidate area displaced through one small pixel block 12b from the SA in the third direction is designated to be the third candidate area, hereinafter referred to as CA3, shown in FIG. 10. A candidate area displaced through one small pixel block 12b from the SA in the fourth direction is designated to be the fourth candidate area, hereinafter referred to as CA4, shown in FIG. 11. A candidate area displaced through one small pixel block 12b from the SA in the fifth direction is designated to be the fifth candidate area, hereinafter referred to as CA5, shown in FIG. 12. A candidate area displaced through one small pixel block 12b from the SA in the sixth direction is designated to be the sixth candidate area, hereinafter referred to as CA6, shown in FIG. 13. A candidate area displaced through one small pixel block 12b from the SA in the seventh direction is designated to be the seventh candidate area, hereinafter referred to as CA7, shown in FIG. 14. A candidate area displaced through one small pixel block 12b from the SA in the eighth direction is designated to be the eighth candidate area, hereinafter referred to as CA8, shown in FIG. 15.

As the focal length is increased from the minimum, the number of the small pixel blocks 12b or large pixel blocks 12B corresponding to the magnitude of displacement is determined to be 2, 3, 4, . . . . The CA1~CA8 are designated as the locations to which the SA is displaced in the first~eighth directions, respectively.

Data corresponding to the designated CA1~CA8 is sent to the recognition block 34. In addition, data corresponding to the SA initially designated by the first setting block 32 is also sent to the recognition block 34. In addition, the image data is sent to the recognition block 34 from the AFE 13.

The recognition block 34 extracts image data components corresponding to the SA and the CA1~CA8 from one frame of image data. Incidentally, the image data component corresponds to luminance value for a group of the small pixel blocks 12b or the large pixel blocks 12B, comprising the SA or the CA1~CA8.

For example, assuming the image data sent at a first timing contains 120, 30, 60, 55, 70, 110, 100, 70, 40, 105, 40, 85, 95, 65, 25, 40, 150, 120, 60, 30, 25, 45, 100, 120, 110, 95, 80, 50, 90, 75, 80, and 20, from left to right and from top to bottom (see FIG. 16), for the small pixel blocks 12b comprising the SA, these luminance values are extracted as the image data component corresponding to the SA at the first timing. Incidentally, if the SA is comprised of thirty two large pixel blocks 12B, the luminance values for large pixel blocks 12B is extracted as the image data component corresponding to the SA, similar to the method for small pixel blocks 12b described above.

The luminance values for the small pixel blocks 12b of the SA or the CA1~CA8 are converted to binary values, for example 0 or 1, based on the extracted image data components. In the conversion to binary values, an average of the luminance values for the small pixel blocks 12b of the SA or the CA1~CA8 is calculated, and each individual luminance value is subsequently compared to the average luminance value. If a luminance value is higher than the average luminance value, the luminance value is converted to 1. If a luminance value is lower than the average luminance value, the luminance value is converted to 0.

For example, the average of the luminance values in the SA shown in FIG. 16 is 73.75. In the conversion to binary values, the luminance value for the small pixel blocks 12b of the SA are converted to 1, 0, 0, 0, 0, 1, 1, 0, 0, 1, 0, 1, 1, 0, 0, 0, 1, 1, 0, 0, 0, 0, 1, 1, 1, 1, 1, 0, 1, 1, 1, and 0 from left to right and from top to bottom, respectively (see FIG. 17). Incidentally, if the SA is comprised of thirty two large pixel blocks 12B, the luminance values for the large pixel blocks 12B are converted to binary values, similar to the method for small pixel blocks 12b described above.

Data corresponding to the binary luminance values of the small pixel blocks 12b is sent to the third setting block 35, which infers to which of the CA1~CA8 the target object, which is captured by the SA at the current timing, is moved to at the subsequent image capturing timing.

Incidentally, the inference is carried out based on the binary luminance values of the small pixel blocks 12b of the SA at one timing and the binary luminance values of the small pixel blocks 12b of the CA1~CA8 at a subsequent timing.

One candidate area is selected from the CA1~CA8 based on a first~eighth likeness value, as described below.

The first~eighth likeness values are calculated values that indicate how similar the image captured on the SA is to the images captured on the CA1~CA8 at the subsequent image capturing timing. To calculate each likeness value, two binary luminance values for small pixel blocks 12b, at the relatively same location in both the SA and the CA1~CA8 are compared to each other and it is determined whether or not they are equal to each other. The likeness value is the number of combinations of compared binary luminance values that are unequal. Accordingly, the lower the likeness value, the greater the similarity inferred between the SA and the candidate area.

The third setting block 35 comprises an exclusive-or circuit (not depicted). The binary luminance values of the small pixel blocks 12*b* at the relatively same location of the SA and the CA1 are input to the exclusive-or circuit. When the binary luminance values of the small pixel blocks 12*b* at the relatively same location of the SA and the CA1 are equal to each other, the exclusive-or circuit outputs 0. On the other hand, when the binary luminance values of the small pixel blocks 12*b* at the relatively same location of the SA and the CA1 are unequal to each other, the exclusive-or circuit outputs 1.

Figure 18:
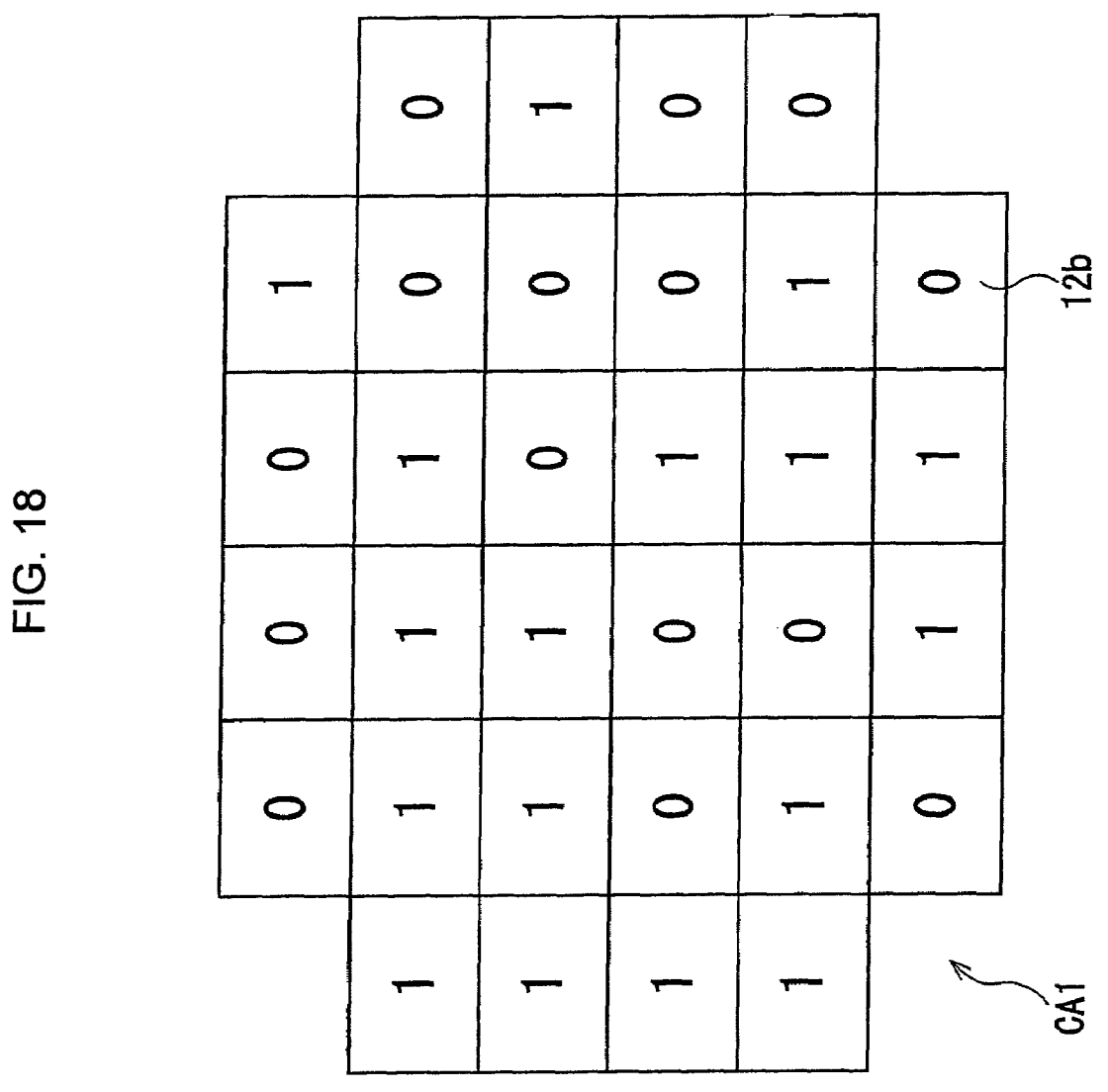

For example, the binary luminance values for the small pixel blocks 12*b* in the CA1 are 0, 0, 0, 1, 1, 1, 1, 1, 0, 0, 1, 1, 1, 0, 0, 1, 1, 0, 0, 1, 0, 0, 1, 1, 0, 1, 1, 0, 0, 1, 1, and 0 from left to right and from top to bottom, respectively, as shown in FIG. 18. When the binary luminance values for the small pixel block 12*b* of the SA and the CA1 in the top row and leftmost column are input to the exclusive-or circuit, the exclusive-or circuit outputs 1. Similarly, when the binary luminance value for the small pixel block 12*b* of the SA and the CA1 in the top row and second to leftmost column are input to the exclusive-or circuit, the exclusive-or circuit outputs 0. Hereinafter, similarly, when the combinations of the luminance values of the small pixel block 12*b* of the SA and the CA1 at the relatively same location is input to the exclusive-or circuit from left to right and from top to bottom, the exclusive-or circuit outputs 0, 1, 1, 0, 0, 1, 0, 1, 1, 0, 0, 0, 0, 1, 0, 1, 0, 1, 0, 0, 0, 0, 1, 0, 0, 0, 1, 0, 0, and 0, respectively. The number of times the exclusive-or circuit outputs 1 is counted and saved as a first likeness value, hereinafter referred to as U(exor).

Similarly, the SA and the CA2 are compared to each other, and the second likeness value, hereinafter referred to as UL(exor), is calculated. Similarly, the SA and the CA3 are compared to each other, and the third likeness value, hereinafter referred to as L(exor), is calculated. Similarly, the SA and the CA4 are compared to each other, and the fourth likeness value, hereinafter referred to as DL(exor), is calculated. Similarly, the SA and the CA5 are compared to each other, and the fifth likeness value, hereinafter referred to as D(exor), is calculated. Similarly, the SA and the CA6 are compared to each other, and the sixth likeness value, hereinafter referred to as DR(exor), is calculated. Similarly, the SA and the CA7 are compared to each other, and the seventh likeness value, hereinafter referred to as R(exor), is calculated. Similarly, the SA and the CA8 are compared to each other, and the eighth likeness value, hereinafter referred to as UR(exor), is calculated.

The third setting block 35 determines the lowest likeness value among U(exor), UL(exor), L(exor), DL(exor), D(exor), DR(exor), R(exor), and UR(exor). The candidate area of which likeness value is the lowest is determined and selected by the third setting block 35 as the area where the target object has moved from the scanning area. The selected candidate area is re-designated as a new scanning area.

Incidentally, when the normal auto focus function is carried out, only the first setting block 32 in the pursuit block 30 is functional while the luminance calculation block 31, the second setting block 33, the recognition block 34, and the third setting block 35 are suspended.

Data corresponding to the SA initially designated by the first setting block 32 is sent to the AF adjustment block 23*a* through the recognition block 34 and the third setting block 35. Incidentally, the initially designated SA remains the SA, dissimilar to the pursuit auto focus function.

Figure 19:
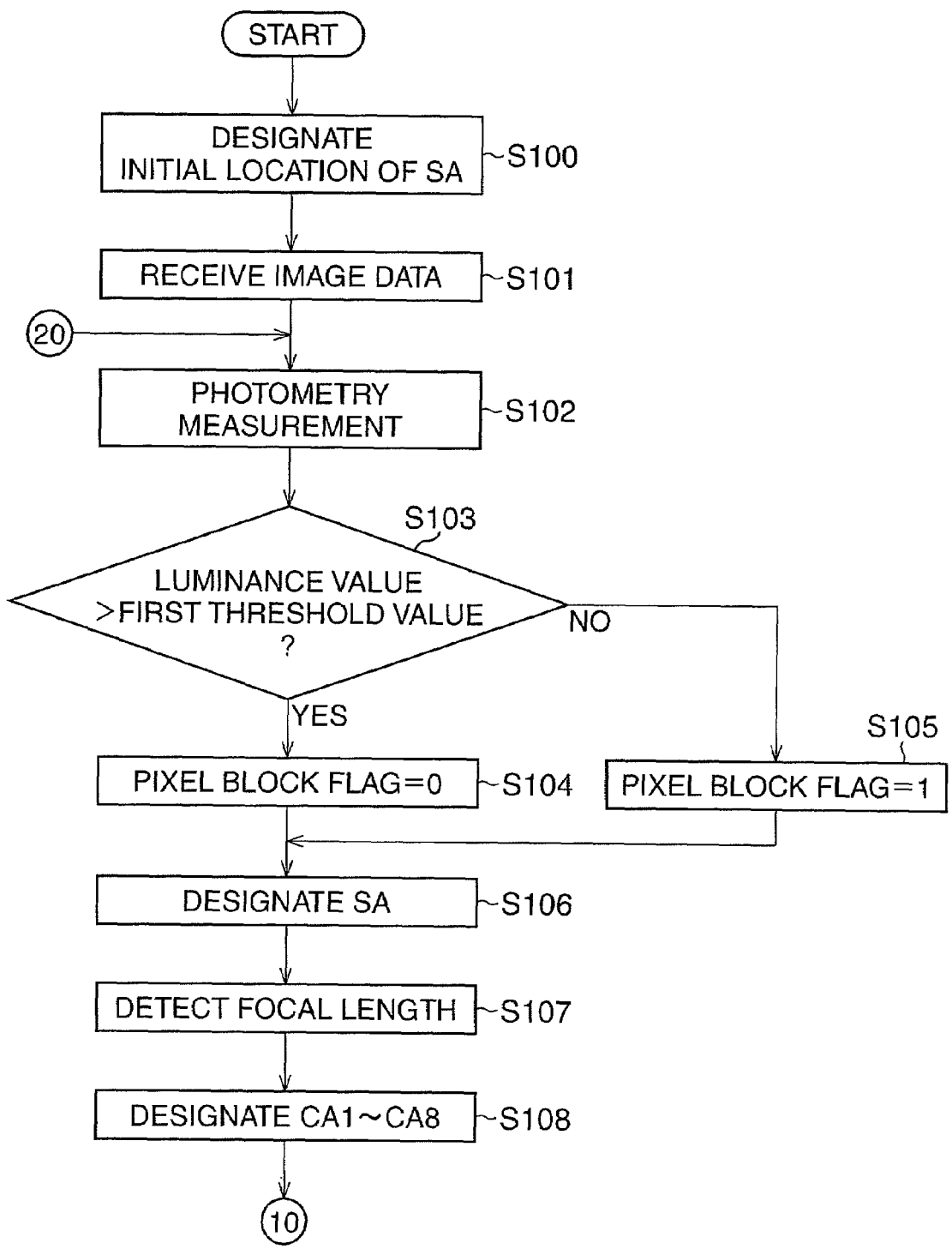
FIG. 19 is a first flowchart explaining the first part of the process for designation of the scanning area carried out by the pursuit block.
Figure 20:
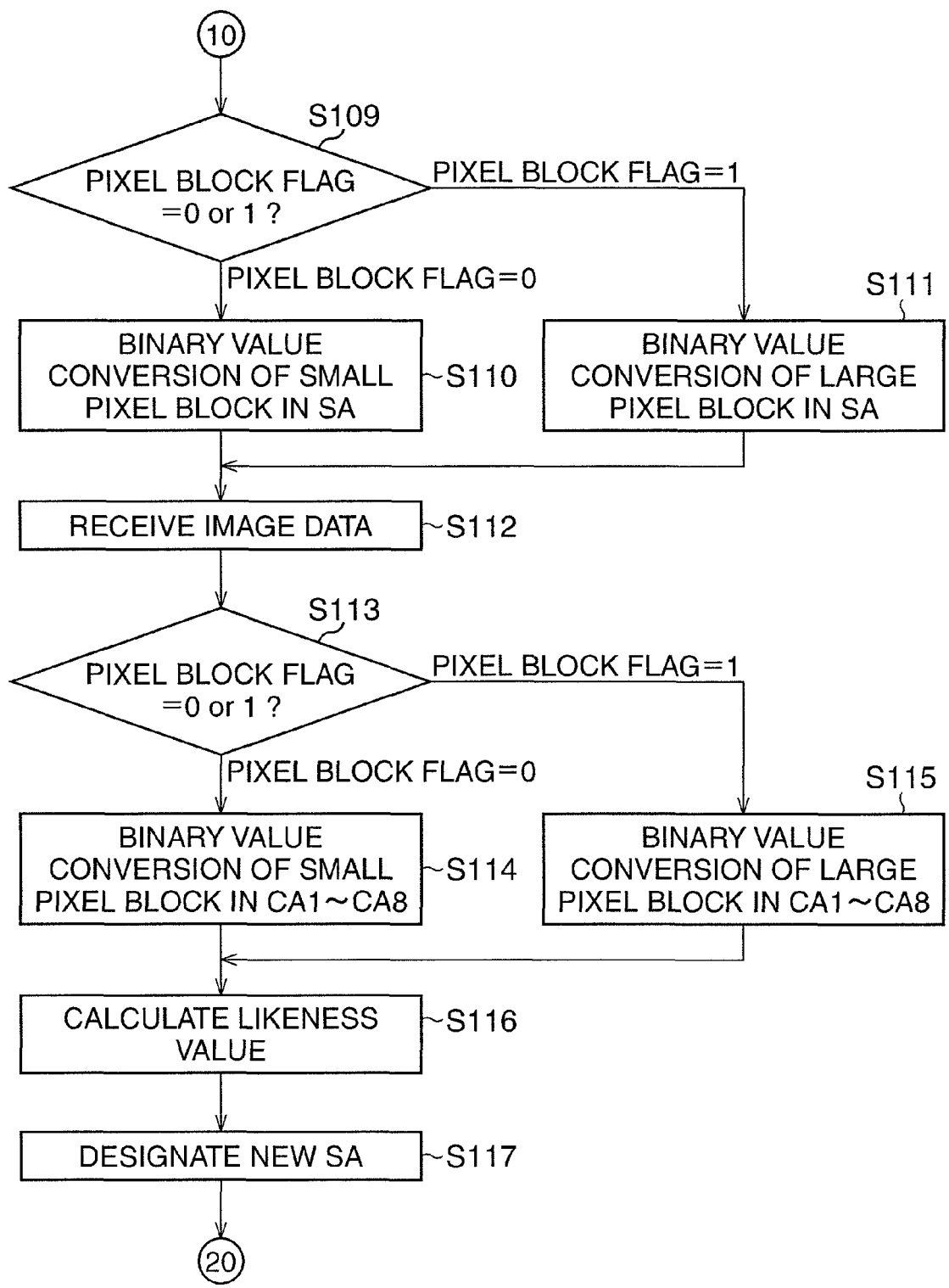
FIG. 20 is a second flowchart explaining the remaining part of the process for designation of the scanning area carried out by the pursuit block.

Next, the process for designation of the scanning area carried out by the pursuit block 30 is explained using the flowchart of FIGS. 19 and 20.

The process for designation of the scanning area starts when the release button is depressed halfway effectively switching on the pursuit auto focus function. Incidentally, the process for designation of the scanning area is repeated until the power button is switched off or the pursuit auto focus function is switched off.

At step S100, an initial location of the SA is designated. The center of the initial location is one point designated according to a user's command input.

At step S101 subsequent to step S100, one frame of image data is received and then the process proceeds to step S102. At step S102, the photometry measurement is carried out. In the photometry measurement, first, data corresponding to the intensity of light incident to each pixel 12*p* is sent from the first data processing block 14*p*1 to the first setting block 32. Second, the first setting block 32 calculate a luminance value for the entire ERA based on the intensity of light incident to each pixel 12*p* in one frame of image data.

At step S103 subsequent to step S102, the luminance value calculated at step S102 is compared to the first threshold value.

When the luminance value calculated at step S102 is higher than the first threshold value, the process proceeds to step S104, where a pixel block flag is designated to be 0. When the luminance value calculated at step S102 is lower than the first threshold value, the process proceeds to step S105, where the pixel block flag is designated to be 1.

After step S104 or step S105 is complete, the process proceeds to step S106, where the SA corresponding to the location designated at step S100 and the pixel block flag designated at either step S104 or step S105 are designated.

At step S107 subsequent to step S106, the focal length of the photographic optical system 11 is detected. In the detection, first, the zooming-driver 16 detects a zoom step corresponding to the relative location of the zoom lens 11*a* and the focus lens 11*b*. Data corresponding to the detected zoom step is sent to the second setting block 33 through the control block 14*c*. The second setting block 33 determines the focal length corresponding to the zoom step.

Once the focal length is detected, the process proceeds to step S108, where the magnitude of displacement from the SA to a candidate area is determined according to the detected focal length. Subsequently, the CA1~CA8 are designated according to the determined magnitude of displacement and the pixel block flag designated at step S104 or S105.

After designation of the CA1~CA8, the process proceeds to step S109, where it is determined whether the pixel block flag is either 1 or 0.

When the pixel block flag is 0, the process proceeds to step S110, where the luminance value of the small pixel blocks 12*b* in the SA are converted to binary values. When the pixel block flag is 1, the process proceeds to step S111, where the luminance value of the large small pixel blocks 12B in the SA are converted to binary values.

After step S110 or S111 is complete, the process proceeds to step S112, where a subsequently generated frame of image data is received. After receiving the image data, the process proceeds to step S113, where it is determined whether the pixel block flag is either 1 or 0.

When the pixel block flag is 0, the process proceeds to step S114, where the luminance values of the small pixel blocks 12*b* in the CA1~CA8 are converted to binary values. When the pixel block flag is 1, the process proceeds to step S115, where the luminance values of the large pixel blocks 12B in the CA1~CA8 are converted to binary values.

After step S114 or S115 is complete, the process proceeds to step S116, where the U(exor), UL(exor), L(exor), DL(exor), D(exor), DR(exor), R(exor), and UR(exor) are calculated based on the binary luminance values in the SA and the CA1~CA8.

At step S117 subsequent to step S116, it is determined which likeness value is the lowest among the U(exor), UL(exor), L(exor), DL(exor), D(exor), DR(exor), R(exor), and UR(exor). The candidate area, of which the likeness value is the lowest, is designated new SA.

When the new SA is designated, the process returns to step S102 and steps S102~117 are repeated. By repetition of steps S117 and S102~S106, the SA is updated.

In the above embodiment, a digital arithmetical unit is effectively used with the pattern matching system. In general, the maximum number of bits which a digital arithmetical unit can process is $2^x$ (where x is a natural number). The number of data required for detection of the likeness value is thirty two bits, which is $2^5$ as described above. Accordingly, the capacity of the digital arithmetical unit can be used completely because the maximum number of bits which a digital arithmetical unit can process is in agreement with the number of data required for the detection.

In addition, the system of the above embodiment is able to carry out the pattern matching more consistently because the luminance values of each pixel block 12b, 12B are converted to binary values. For example, when the SA or a candidate area receives light emitted from a light source that flickers, such as fluorescent light, a portion of the calculated likeness value may not compare to the actual optical image. However, the pattern matching is carried out with greater consistency because the influence of such flicker is reduced as a result of the conversion to binary values.

In addition, in the above embodiment, the size of the pixel block used for the pattern matching process is changed according to the intensity of light incident to the entire ERA. The ability to change the size of the pixel block mitigates the potential for error, caused by noise, in the pattern matching process. This can be explained by the fact that when the intensity of light incident to the entire ERA is generally low, the S/N ratio is also low. However, the number of pixels used for calculating a luminance value of a pixel block increases as the size of the pixel block is enlarged, whereas the noise level does not increase. In this regard, the influence of noise from each pixel signal is neutralized throughout the entire pixel block.

In addition, in the above embodiment, the capacity exists to increase the accuracy of the pursuit of the targeted object by changing the magnitude of displacement of the CA1~CA8 from the SA according to the focal length of the photographic optical system 11, because the speed of movement of an object on the image receiving surface increases as the designated focal length is increased.

In addition, in the above embodiment the luminance value of the small or large pixel block 12b, 12B is also used for the detected light intensity of required for the spot photometry measurement or the spot emphasized photometry measurement. Accordingly, the processing time is reduced in comparison to when the processing for detecting the intensity of light and for detecting the luminance value of the pixel block 12b, 12B are carried out separately.

The number of the small or large pixel blocks 12b, 12B comprising the SA or the candidate area is equal to the fifth power of two in the above embodiment. However, the number may be determined to be the nth power of two, provided that it is equal to the bit number of a digital arithmetical unit used for the pattern matching system.

The direction in which the targeted object is moved is determined to be one of eight directions in the above embodiment. However, the direction can be determined to be one of a plurality of directions.

One small pixel block 12b or one large pixel block 12B corresponds to the magnitude of displacement from the SA to the CA1~CA8 when the focal length is adjusted to its minimum value by positioning the zoom lens 11b at the wide-angle end of the above embodiment. However, any number of small pixel blocks 12b or large pixel blocks 12B can correspond to the magnitude of displacement. The same effect as that of this embodiment can be achieved as long as the magnitude of displacement is adjusted so that the distance increases with increasing the focal length.

The SA and the CA1~CA8 form the shape of a cross in the above embodiment, however, any shapes are adaptable.

The luminance values of the small or large pixel blocks 12b, 12B comprising the SA or the CA1~CA8 are converted to binary values in the above embodiment. However, the luminance values can be converted to any number of different levels, or, such conversions may not be carried out at all. Of course, the effect as described above is achieved by carrying out the conversion into binary values, or into values of a level that is different from that of binary values.

The exclusive-or circuit outputs 0 when the binary luminance values of the small pixel blocks 12b at the relatively same location of the SA and the CA1 are equal to each other, in the above embodiment. However, an arithmetical circuit mounted in the third setting block 35 may output 0 when the absolute value of the difference of the converted or non-converted luminance values of the pixel blocks at the relatively same location of the SA and the CA1~CA8 is lower than a predetermined standard value. Also, the number of pixel blocks outputting 1 by the arithmetical circuit may be counted as the likeness value. Incidentally, the predetermined standard value is 0 in the above embodiment.

The size of the pixel block used for the pattern matching process is selected from two different sizes according to the brightness of the entire ERA, in the above embodiment. However, the size of the pixel block used in the pattern matching process can be selected from any number of sizes, or can even be fixed, neither of which would diminish the effectiveness of using the digital arithmetical unit. Of course, the same effect described above can be achieved by changing the size according to the brightness.

The size of the pixel block used for the pattern matching process is selected from two different sizes according to the brightness of the entire ERA, in the above embodiment. However, the size is selected according to the brightness of only a part of the ERA.

The magnitude of displacement from the SA to the CA1~CA8 is changed according to the focal length of the photographic optical system 11, in the above embodiment. However, the digital arithmetical unit can be used effectively achieved even if the magnitude of displacement is not changed. Of course, the same effect described above can be achieved by changing the magnitude of displacement according to the focal length.

The pixel block 12b, 12B is used for detecting the intensity of light for the spot photometry measurement or the spot emphasized photometry measurement, in the above embodiment. In addition, the pixel block 12b, 12B can be used for detecting the intensity of light for the white balance processing. The effectiveness of the digital arithmetical unit can be achieved even if the pixel block 12b, 12B is not used, outside of pattern matching. However, if the detection of the intensity of light incident to the partial ERA is necessary for a function other than the pattern matching, the processing time can be shortened by using the luminance value of the pixel block.

The exclusive-or circuit is used in the above embodiment to determined whether or not the binary luminance values of the small pixel block 12b comprised in the SA, and those of CA1~CA8 are similar to each other. Another arithmetical circuit, such as an exclusive-nor circuit, can be used for the purpose of the determination.

The U(exor), UL(exor), L(exor), DL(exor), D(exor), DR(exor), R(exor), and UR(exor) are calculated based on the luminance value of the small or large pixel block 12b, 12B, in the above embodiment. However, a variable is not restricted to the luminance value for calculation. For example, the calculations can be based on a signal level of a pixel signal generated by the pixel covered with a green color filter, or any other color filter.

The position of the focus lens 11b where an object is brought into focus is determined according to the contrast detecting method in the above embodiment. However, the position of the focus lens 11b can be determined according to any other method, such as the phase difference detection method.

The pixels are arranged in a matrix within the ERA in the above embodiment. However, the arrangement of pixels is not restricted to a matrix and can be arrange in any two-dimensional pattern.

The auto focus functions are carried out for the targeted object pursued by the pursuit block 30 in the above embodiment. However, the pursuit function utilized by the pursuit block 30 to pursue the movement of the targeted object can be adapted to another function. For example, a monitoring camera can display a moving targeted object and a mark showing the targeted object by being adapted to the monitoring camera. Or the exposure adjustment can be automatically carried out for a moving targeted object.

The pattern matching system is used for the pursuit function in the above embodiment. However, the pattern matching system can be used for other functions, such as a face identification system.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-072652 (filed on Mar. 16, 2006), which is expressly incorporated herein, by reference, in its entirety.

The invention claimed is:

1. A pattern matching system that outputs a likeness value showing how much a first and a second image compare to each other, said pattern matching system comprising:

a designation block that designates as data to be compared first and second digital image data comprising all pattern area data generated from individual pattern areas in said first and second images, respectively, and said first and second digital image data not including any area data generated from pattern areas outside of said first and second images, said first and second digital image data comprising $2^x$ number of pattern area data wherein x is a positive integer, data levels of said pattern area data varying according to the intensity of light incident to a pattern area, said first and second images comprising $2^x$ number of said pattern areas;

a comparison block that compares said data levels of said pattern area data corresponding to said pattern areas at the relatively same location in said first and second images;

a calculation block that calculates said likeness value, said likeness value varying according to the number of said pattern areas where the absolute value of the difference between said compared data levels of said pattern area data of said first and second images is less than a predetermined standard value; and an output block that outputs said likeness value, wherein said pattern area is broadened when the intensity of light of said entire first or second image is lower than a first threshold value.

2. A pattern matching system according to claim 1, further comprising:

a data converter that converts said data levels of said area data included in said first and second digital image data into binary values, and said comparison block comparing binary data levels of said pattern areas at the relatively same location in said first and second images.

3. A pattern matching system according to claim 1, further comprising:

a signal receiver and a data generator, said data receiver receiving pixel signals generated by said pixels within said pattern area, signal levels of said pixel signals varying according to the light intensity incident to said pixels, said data generator generating said area data based on said pixel signals of a single pattern area; and wherein said data generator generates large area data as said area data when the intensity of light of said entire first or second image is lower than said first threshold value, data levels of said large area data varying according to the intensity of light incident to a large pattern area, said large pattern area being said broadened pattern area, wherein said comparison block compares data levels of said large area data corresponding to said large pattern areas at the relatively same location in said first and second images when the intensity of light of said entire first or second image is lower than said first threshold value, and wherein said calculation block calculating said likeness value according to the number of said large pattern areas where the absolute value of the difference between said compared data levels of said large area data of said first and second images is less than said predetermined standard value.

4. A targeted object pursuit system that pursues the movement of a targeted object within a plurality of sequentially captured images, said targeted object pursuit system comprising:

a first setting block that initially designates a partial area located at a predetermined location in said captured image as a pursuit area for pursuing said targeted object;

a second setting block that designates areas displaced from said pursuit area in a first and second direction as a first and second candidate area, respectively;

a recognition block that extracts a standard image corresponding to said pursuit area from said captured image captured at a first timing, said recognition block extracting a first and second candidate image corresponding to said first and second candidate areas, respectively, from said captured image captured at a second timing which is subsequent to said first timing;

a data generator that generates pattern area data from individual pattern areas in said standard image and said first and second images, respectively, and not from pattern areas outside of said standard image and said first and second images, the data level of said pattern area data varying according to the intensity of light incident to a pattern area, said standard image and said first and second images comprising 2^x number of said pattern areas wherein x is a positive integer;

a comparison block that compares said data level of said area data corresponding to said pattern areas at the relatively same location in said standard image and one of either said first or second images;

a calculation block that calculates said likeness value, said likeness value varies according to the number of said pattern areas where the absolute value of the difference between said compared data levels of said pattern area data is less than a predetermined standard value;

a determination block that determines which direction said targeted object moves during a period between said first and second timing to be either said first or said second direction based on the difference between said likeness value of said standard image and said first candidate image and said likeness value of said standard image and said second candidate image; and a re-designation block that re-designates a candidate area corresponding to said determined direction where said targeted object moved as said new pursuit area, wherein said pattern area is broadened when the intensity of light of said entire first or second image is lower than a first threshold value.

5. A targeted object pursuit system according to claim 4, wherein said second setting block designates said first and second candidate areas so that the distance between said pursuit area and a first and second areas increases according to a focal length of a photographic optical system, an optical image of said targeted object passing through said photographic optical system.

6. A targeted object pursuit system according to claim 4, further comprising:

an exposure adjustment system that can carry out the exposure adjustment for an optical image of said targeted object received by an imaging device according to the intensity of light of a part of said optical image, and said intensity of light incident to said pattern area being used for said intensity of light of a part of said optical image for said exposure adjustment.

* * * * *